US010853925B2

United States Patent
Xiao et al.

(10) Patent No.: US 10,853,925 B2
(45) Date of Patent: Dec. 1, 2020

(54) METHODS, SYSTEMS, AND MEDIA FOR IMAGE PROCESSING

(71) Applicant: CHONGQING UNIVERSITY OF POSTS AND TELECOMMUNICATIONS, Chongqing (CN)

(72) Inventors: Bin Xiao, Chongqing (CN); Guoyin Wang, Chongqing (CN); Weisheng Li, Chongqing (CN)

(73) Assignee: CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 197 days.

(21) Appl. No.: 16/053,728

(22) Filed: Aug. 2, 2018

(65) Prior Publication Data
US 2018/0374203 A1 Dec. 27, 2018

Related U.S. Application Data

(63) Continuation of application No. PCT/CN2016/073296, filed on Feb. 3, 2016.

(51) Int. Cl.
*G06T 5/40* (2006.01)
*G06T 5/20* (2006.01)
(Continued)

(52) U.S. Cl.
CPC .............. *G06T 5/40* (2013.01); *G06K 9/6212* (2013.01); *G06T 5/007* (2013.01); *G06T 5/009* (2013.01);
(Continued)

(58) Field of Classification Search
CPC ... G06T 5/20; G06T 2207/00; G06T 2207/10; G06T 2207/10024; G06T 2207/20;
(Continued)

(56) References Cited

U.S. PATENT DOCUMENTS 8,724,196 B2 * 5/2014 Kobayashi .............. G06T 5/008
358/522
2007/0047807 A1 * 3/2007 Okada .................. H04N 5/2351
382/169

(Continued)

FOREIGN PATENT DOCUMENTS

CN 103606137 A 2/2014

OTHER PUBLICATIONS

International Search Report in PCT/CN2016/073296 dated Oct. 27, 2016, 5 pages.
(Continued)

*Primary Examiner* — Dwayne D Bost
*Assistant Examiner* — Stephen M Brinich
(74) *Attorney, Agent, or Firm* — Metis IP LLC

(57) ABSTRACT

Implementations of the disclosure provide for methods, systems, and machine-readable media for image processing. In some embodiments, a method for image processing includes: generating, by a processor, a first histogram and a first parameter set for a first image; constructing, by the processor, a model representative of a second histogram of a second image based on an adjustment parameter set and the first parameter set; generating the second histogram based on the model; and generating a second image based on the first image and the second histogram. In some embodiments, the first histogram is a two-dimensional histogram.

20 Claims, 16 Drawing Sheets

(51) Int. Cl.
*G06T 5/00* (2006.01)
*G06T 7/90* (2017.01)
*G06K 9/62* (2006.01)

(52) U.S. Cl.
CPC ............... *G06T 5/20* (2013.01); *G06T 7/90* (2017.01); *G06T 2207/10024* (2013.01); *G06T 2207/20076* (2013.01)

(58) Field of Classification Search
CPC . G06T 2207/20076; G06T 2207/20081; G06T 2207/20048; G06T 7/44
USPC .................................................. 382/168–172
See application file for complete search history.

(56) References Cited

U.S. PATENT DOCUMENTS

| | | | | |
|---|---|---|---|---|
| 2009/0060327 A1* | 3/2009 | Chiang | ................ | G06K 9/4652 382/168 |
| 2010/0195901 A1* | 8/2010 | Andrus | .................. | H04N 5/213 382/162 |
| 2012/0106842 A1 | 5/2012 | Chen et al. | | |
| 2013/0039577 A1* | 2/2013 | Chiu | .................... | G06K 9/4647 382/169 |
| 2013/0287299 A1* | 10/2013 | Huang | ..................... | G06T 9/00 382/169 |

OTHER PUBLICATIONS

Written Opinion of the International Searching Authority in PCT/CN2016/073296 dated Oct. 27, 2016, 4 pages.

Liang Xie et al., Remote Sensing Image Enhancement Based on Wavelet Analysis and Histogram Specification, 2014 IEEE 3rd International Conference on Cloud Computing and Intelligence System(2014).

Tong Zhao et al., Image Specification Algorithm Based on Multi-peaks Gausssian Function, Computer Science, 41 (12), Dec. 31, 2014.

Turgay Celik, Two-dimensional histogram equalization and contrast enhancement, Pattern Recognition,45 (10): pp. 3810-3824 (2012).

* cited by examiner

|     |     |     |     |     |     |     |
|-----|-----|-----|-----|-----|-----|-----|
| .24 | .28 | .32 | .33 | .32 | .28 | .24 |
| .28 | .35 | .45 | .50 | .45 | .35 | .28 |
| .32 | .45 | .71 | 1.0 | .71 | .45 | .32 |
| .33 | .50 | 1.0 | P   | 1.0 | .50 | .33 |
| .32 | .45 | .71 | 1.0 | .71 | .45 | .32 |
| .28 | .35 | .45 | .50 | .45 | .35 | .28 |
| .24 | .28 | .32 | .33 | .32 | .28 | .24 |

FIG. 5

METHODS, SYSTEMS, AND MEDIA FOR IMAGE PROCESSING

CROSS-REFERENCE TO RELATED APPLICATIONS

This application is a continuation of International Application No. PCT/CN2016/073296, filed on Feb. 3, 2016, designating the United States of America, the contents of which are hereby incorporated by reference.

TECHNICAL FIELD

The present disclosure relates to image processing, and more particularly relates to methods, systems, and media for image enhancement based on contextual information of pixels in an image.

BACKGROUND

Image enhancement techniques, such as histogram equalization, can be used to improve interpretability and/or perception of information of images for a viewer. These techniques can also be used to process an image such that the visual content of the processed image is more pleasing or more useful for machine vision applications (e.g., image segmentation, object recognition, etc.).

Histogram equalization aims to improve visual appearance of an image by adjusting contrast of an image. Histogram specification is a generalization of histogram equalization and may be used to change the histogram of an image to any specified histogram. Histogram specification may be used for global and local contrast enhancement of images. Conventional image enhancement techniques suffer from a number of disadvantages. For example, conventional image enhancement techniques fail to provide solutions for multi-dimensional data. Meanwhile, enhanced images generated using conventional image enhancement techniques do not have desired quality and may lose details of original images based on which the enhanced images are generated. In addition, implementing convention image enhancement techniques may require intensive administrative work by a user.

Accordingly, new mechanisms for image enhancement are desirable.

SUMMARY

Methods, systems, and media for image processing are provided. The methods, system and media may utilize a histogram specification to enhance a digital image may be used to enhance the clarity or contrast of an image without losing its detail.

According to one aspect of the present disclosure, methods for image processing are provided. The methods include: generating, by a processor, a first histogram and a first parameter set for a first image; constructing, by the processor, a model representative of a second histogram of a second image based on an adjustment parameter set and the first parameter set; generating the second histogram based on the model; and generating a second image based on the first image and the second histogram.

In some embodiments, the first histogram is a two-dimensional histogram.

In some embodiments, the model is constructed based on at least one of a Gaussian function, a Lorentzian function, an exponential function, or a polynomial function.

In some embodiments, the first parameter set includes a parameter indicative of luminance information of the first image.

In some embodiments, the first parameter set includes a parameter indicative of contrast information.

In some embodiments, the adjustment parameter set is received via an input device.

In some embodiments, the adjustment parameter set is determined by the processor.

In some embodiments, the method further includes: generating a third image including a first component and a second component based on the first image, wherein the first image is in a first color space, and wherein the third image is in a second color space; generating an enhanced component based on the second component of the third image, wherein the second component comprises luminance information about the third image; and generating the second image based on the enhanced component.

In some embodiments, constructing the first histogram further includes: determining contextual information about each of a plurality of pixels in the first image; and constructing the first histogram based on the contextual information.

In some embodiments, determining the contextual information includes: identifying at least one neighboring pixel of a first pixel of the plurality of pixels; and determining contextual information about the first pixel based on a gray-level of the neighboring pixel.

In some embodiments, the method further comprises determining the contextual information about the first pixel based on a distance between the first pixel and the neighboring pixel.

In some embodiments, the first image is an RGB formatted image.

In still yet another embodiment of the present disclosure, the first two-dimensional histogram includes contextual information in the first image.

According to another aspect of the present disclosure, systems for image processing are provided. The systems include a memory; and a processor communicatively coupled to the memory, the processor to: generate a first histogram and a first parameter set for a first image; construct a model representative of a second histogram of a second image based on an adjustment parameter set and the first parameter set; generate the second histogram based on the model; and generate a second image based on the first image and the second histogram.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 5 is a diagram illustrating examples of weighting factors in a neighborhood window surrounding a pixel in accordance with some embodiments of the present disclosure.

DETAILED DESCRIPTION

Figure 1:
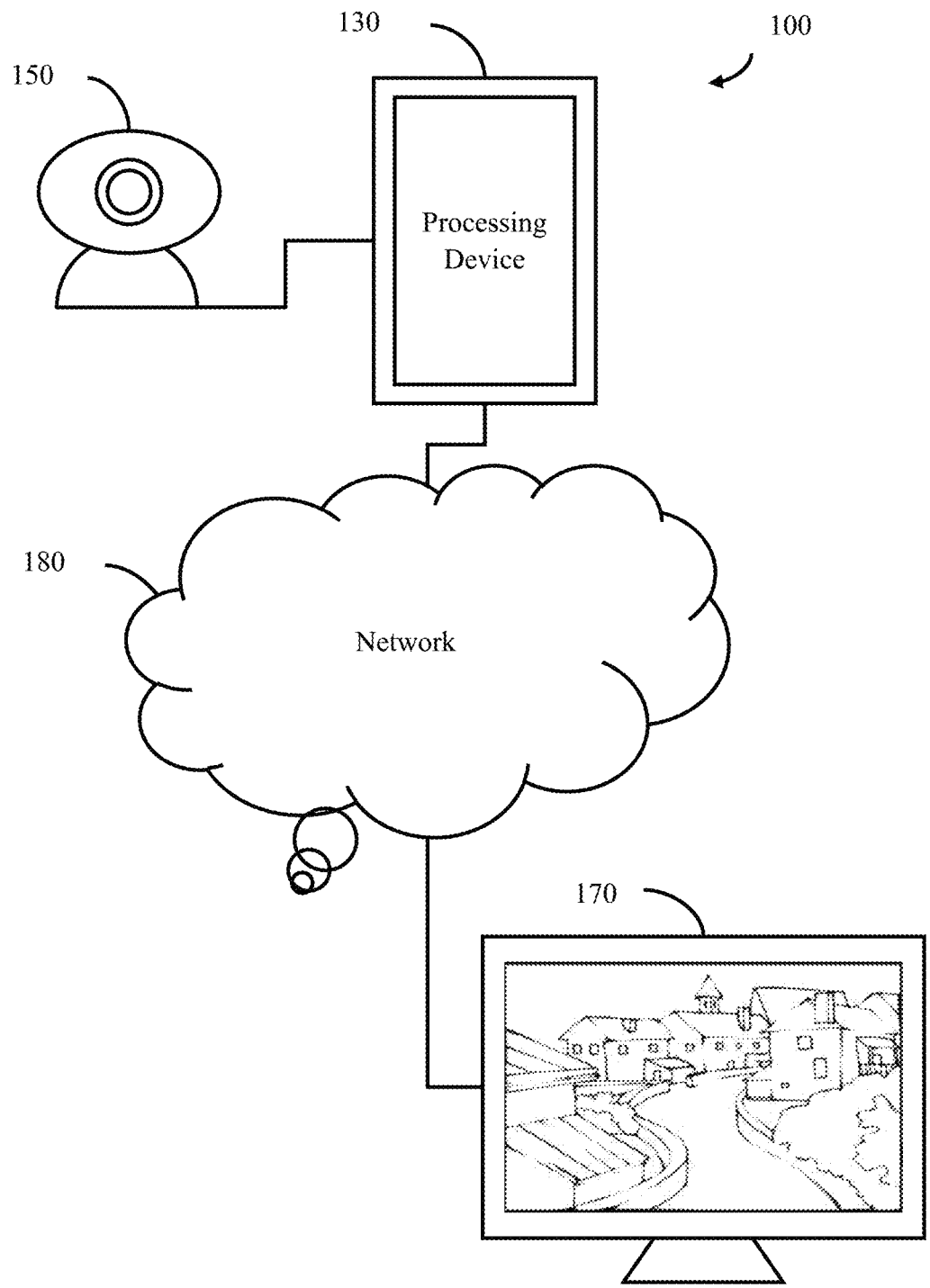
FIG. 1 is a schematic diagram illustrating an example of a system for processing images in accordance with some embodiments of the disclosure.

The present disclosure provides a method and system which may be used for analyzing and processing images. Specifically, the present disclosure provides mechanisms that may be used to analyze and improve the quality of still as well as moving images or videos, including, without limitation, to, single-frame or cine-loop images.

Various example embodiments of the present disclosure will now be described by way of example with reference to the accompanying drawings. However, the scope of the present disclosure is not limited to the following embodiments.

In the following description, the same reference numerals denote the same elements.

In embodiments of this disclosure, the images are consisted of a plurality of picture elements (hereafter denoted as "pixels") over a rectangular grid (e.g., Cartesian) grid, but this need not necessarily be the case, as other grids (triangular, polar, etc.) known by person skilled in the art may be defined and employed.

Some terms are used interchangeably throughout this disclosure. For example, the term "intensity information", "lightness information" and "luminance information" are interchangeable, referring to the value of the channel representing lightness or luminance in a pixel, such as the L channel in the Lab color space, or the Y channel in a YUV color space. "Color information" has the same meaning with the term "chromatics." The terms "Gaussian function" and "normal distribution function" are used interchangeably.

The term "contrast" may refer to the amount of color or grayscale differentiation that exists between various image features in both analog and digital images. Images having a higher contrast level generally display a greater degree of color or grayscale variation than those of lower contrast. There are several definitions of contrast currently, for example, lightness contrast, Weber contrast, Michelson contrast, or root mean square (RMS) contrast, which are known in the field of image processing.

The contrast of a digital image is related to the RGB intensity (grayscale) values of the optical image and the accuracy of the digitizing device used to capture the optical image. The RGB intensity refers to the amount of red, green, and blue light energy actually reflected by, or transmitted through, the physical objects. Many factors including inadequate illumination or foggy weather occur in a capturing scenario, which are often major causes of low contrast in digital images. The RGB intensity range utilized in construction of a color digital image is known as the intrascene dynamic range, and is a function of both the intensity range of the optical image (scene-dependent) and the accuracy of the camera used to capture the image (device-dependent). If the real scene is characterized by fog, dust or other the dynamic range of the digital image is severely limited by the camera's digitizer (a low-resolution A/D converter), then too few intensity levels will be available in each color channel to represent the subtle differences of intensity that may occur in the optical image. As a result, image contrast will suffer.

Deficiencies in digital image contrast may often be corrected by utilizing an intensity transformation operation, which is an algorithm designed to transform each input brightness value to a corresponding output brightness value via a transfer function. Many digital contrast enhancement techniques have been used in order to optimize the visual quality of the image for human or automatic machine vision through gray-scale or histogram modifications. All these methods try to enhance the contrast of the input image, and moreover there is no universal criterion or unifying theory specifying the validity of a given enhancement technique. The purpose of these methods is simply to define a set of rules for assigning input pixel brightness values to output pixel brightness values. For images having low contrast, an intensity transformation may be employed to broaden the range of brightness values present in each color channel of the image, resulting in an overall increase in image contrast. However, in order for a contrast manipulation algorithm to perform properly, there must be sufficient variance in the pixel brightness values between pixel ensembles in the low-contrast image.

A histogram of an image may refer to a graph showing the number of pixels in the image at each distinct intensity value found in that image. For example, the histogram of a digital image with gray levels in the range [0,L−1] may be represented as a discrete function that maps the intensity of a gray level to the number of pixels in the image having the corresponding intensity. As another example, an 8-bit grayscale image, may correspond to 256 different possible intensities. A histogram of the 8-bit grayscale image m graphically display 256 numbers showing the distribution of pixels amongst those grayscale values.

Once an image is ready, it may be scanned in a single pass and a running count of the number of pixels found at each intensity value may be determined. The information about the number of pixels may then be used to construct a suitable histogram which may be subsequently stored. In some embodiments, intensity information about all of the pixels in an image may be considered to construct a histogram of the image. For example, the intensity information may be determined by scanning the pixels of the image row-by-row, column-by-column, diagonally, or in any other suitable manner. After all the pixels are scanned and/or processed, the frequency corresponding to each intensity value may be determined. A histogram may then be generated by depicting intensity values and their corresponding frequencies.

In some embodiments, histogram equalization (HE) can be performed based on the presumption that the information carried by an image is related to the probability of the occurrence of each gray level. To maximize the information, a transformation function can be used to redistribute the probabilities of gray level occurrences to be uniform. In this way, the contrast at each gray level is proportional to the height of the image histogram.

"Color depth" (also referred to as "bit depth") may refer to the number of bits used to indicate the color of a single pixel in a bitmapped image or video frame buffer. "Color depth" may also refer to the number of bits used for each color component of a single pixel. Color depth is one aspect of color representation, expressing how finely levels of color may be expressed. For an n-bit gray-scale image, the maximal number of colors are $2^n$, where n is a positive integer number denoted as bit depth or color depth. A grayscale image may utilize an 8-bit color space, thus the number of its colors may be no less than 1, and no more than 256. Any suitable value may be assigned to n. For example, the value of n may be 1 for black and white images. As another example, for a "true color" image, the value of n may be 2, 3, 4, 8, 16, 24, 32, etc.

To process an image, especially when the image is a color image, several preprocessing steps may be carried out in advance.

A color space is a specific organization or arrangement of various colors, which stimulate different light receptors in human eyes. In combination with physical device profiling, color spaces make reproducible representations of color possible, in both analog and digital representations. Due to a lot of reasons, images acquired by capturing devices, stored by storage devices, shared over the internet, or used by printing apparatus often vary in color spaces. To be able to handle images with different color spaces, color transformation, or sometimes called color conversion, is usually included in the preprocessing steps, especially in the image enhancement. This manipulation may change images in various color spaces to images in a common color space. Conventional image acquisition devices often utilize one specific kind of various RGB (red, green, and blue) color spaces (Adobe® RGB (1998), sRGB, ProPhoto RGB, etc.) to store a color image captured by its optics. Similarly, images are usually stored in the same RGB color space. The RGB format labels the different colors according to the human vision system and expresses a color image in terms of red (R), green (G) and blue (B) components. On the other hand, because of human the lightness information, rather than the color information, is paid more attention in many applications. Therefore, alternative color spaces including the Lab color space, YUV color spaces (e.g., YUV PAL, YDbDr SECAM, YCbCr, YPbPr, xvYCC, etc.), and YIQ color space are proposed. Since human vision is more sensitive to brightness than to color, those color spaces explicitly address the lightness information of an image.

Histogram specification may be carried on a grayscale image and/or a color image. For example, the histogram specification may be performed on a color image by performing histogram specification on one or more individual color components (e.g., the red, green and blue components of the RGB color values of an RGB image, cyan (C), magenta (M), yellow (Y), and key (K) components of the CMYK color values of a CMYK image, etc.). In some embodiments, a color image may first be converted to another color space, which separates intensity information (e.g., lightness values) and color information (e.g., chromatics values), such as the Lab color space, YUV/YIQ color spaces, the HSL/HSV color space, etc. The histogram specification algorithm may then be applied to the intensity channel without resulting in changes to the hue and saturation of the image. Thus these transformations preserve the chroma and change the lightness at the same time.

Accordingly, an image in an RGB or CMYK color space may be converted to a different color space, such as a Lab color space, a YUV color space, a grayscale color space, etc. The way of converting a color image to an image in the Lab or YUV or grayscale color space is not unique; depending on different weightings of the color channels. It may be conducted in various ways, e.g. colorimetric (luminance-preserving) conversion.

For example, the Lab color space represents a color image with one lightness component L and two color-opponent components a and b. One of the most important attributes of the Lab model is device independence. The Lab color space includes all perceivable colors, which means that its gamut exceeds those of the RGB and CMYK color models (e.g., ProPhoto RGB includes about 90% all perceivable colors). Every kinds of RGB color spaces and CMYK color spaces are subsets of the much larger Lab color space. This means that the colors are defined independent of their nature of creation or the device they are displayed on. The Lab color space is used as an interchange format between different devices as for its device independency. The space itself is a three-dimensional real number space, which contains an infinite possible representations of colors, in contrast with the RGB color spaces, which have a finite number of colors. The transformation of an image in an RGB format to an image in the Lab color space may comprise the step involving a transformation matrix, which is a routine procedure in the field of image processing.

Although the color space transformation is discussed hereinbefore, the disclosed subject matter may be implemented in connection with any other image processing technique, such as image cropping, optical aberration calibration which deals with lens distortion, spherical aberration, coma, astigmatism, chromatic aberration, defocus and lens tilt, white-balance calibration, noise reduction, deblurring, edge detection, high dynamic range (HDR) processing, shake reduction, image compression or any other operations, as known by those skilled in the art, may also be included. Some spatial transformations, such as log transformations, power-law transformations, gray-level slicing may also be implemented to an image to be enhanced. The preprocessing techniques aiming at different purposes may be executed individually or in combination. Their purposes are to improve the quality of the image, and to make the image easier to be manipulated by histogram specification or histogram equalization. However, an image may be processed by image enhancement steps provided in this disclosure without any prior preprocessing, for example, a gray-scale image taken by a video monitoring camera.

When constructing a histogram for an image, conventional image histogram specification techniques consider every single gray-level without taking into account contextual information about pixels in the image (e.g., intensities of adjacent pixels). Conventional image enhancement techniques suffer from a number of disadvantages. As such, these image enhancement techniques fail to provide solutions for multidimensional data. Meanwhile, enhanced images generated using conventional image enhancement techniques do not have desired quality and may lose details of original images based on which the enhanced images are generated. In addition, implementing convention image enhancement techniques may require intensive administrative work by a user.

To address these deficiencies, the present disclosure provides mechanisms (which can include methods, systems, and media) for image enhancement based on contextual information of pixels in an image.

As referred to herein, "contextual information" of a given pixel in an image may refer to any information about one or more pixels located in a neighborhood window around the given pixel (also referred to herein as the "neighboring pixels"). Such information may include, for example, one or more gray-levels of the neighboring pixel(s), intensity values of the neighboring pixels, positional information about the neighboring pixel(s) (e.g., one or more coordinates), a distance between a neighboring pixel and the given pixel, etc. The neighborhood window may include any portion of the image. The neighborhood window may have any suitable size (e.g., including any number of neighboring pixels) and/or shape.

In some embodiments, the mechanisms can generate a multidimensional histogram (e.g., a two-dimensional (2D) histogram) based on contextual information related to each pixel of an input image. One or more parameters about the average gray-level and contrast of the input image may also be determined based on the multidimensional histogram. These parameters may then be used to estimate the average gray-level and contrast of an output image (e.g., also referred to as the "enhanced image"). The mechanisms can also construct a histogram of the output image to enhance the input image. The histogram of the output image may be constructed based on the Gaussian probability density function in some embodiments.

FIG. 1 shows a generalized schematic diagram illustrating an example 100 of a system for processing images in accordance with some embodiments of the disclosed subject matter.

As illustrated, system 100 may include one or more processing device(s) 130, image acquisition device(s) 150, display device(s) 170, network(s) 180, and/or any other suitable component for processing images in accordance with the disclosed subject matter.

Processing device(s) 130 may be and/or include any computing device that is capable of processing images in accordance with various embodiments of the present disclosure. In some embodiments, processing device(s) 130 may be and/or include a processing device 200 as described in conjunction with FIG. 2 below.

Image acquisition device(s) 150 may be and/or include any suitable device that is capable of capturing images (e.g., still images, moving images, etc.). For example, an image acquisition device may be a camera, a video recorder, a scanner, a mobile telephone, a tablet computing device, a wearable computing device, and/or any other suitable device that may capture, detect, and/or process images. The image acquisition device(s) 150 may include a charge-coupled device (CCD), a complementary metal-oxide-semiconductor (CMOS) sensor, an N-type metal-oxide-semiconductor (NMOS), a contact image sensor (CIS), and/or any other suitable image sensor. The image acquisition device(s) 150 may be used in a surveillance system, transportation monitoring network, or any other scenarios in which motion pictures are taken to record or monitor the scenes.

Display device 170 may be and/or include any device that is capable of presenting images (e.g., still images, moving images, etc.) and/or any other media content (e.g., video content, audio content, text graphics, etc.). For example, display device 170 may be a display of a computing device (e.g., a computer, a mobile phone, a tablet computer, a wearable computing device, etc.), a television set, etc. Display device 170 may be and/or include a cathode ray tube display, a liquid crystal display, a light-emitting diode display, an electronic paper display, a plasma display, etc. In some embodiments, display device 170 may display images representing real-time scenes via the network 180 in wired or wireless connections.

Network 180 may be any suitable computer network such as the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), a satellite network, a mobile phone network, a mobile data network, a cable network, a telephone network, a fiber optic network, and/or any other suitable communication network, or any combination of any of such networks. Alternatively or additionally, the network 180 may be composed by several components in one single hardware connected by a bus, such as a system bus.

In some embodiments, each of processing device 130, image acquisition device 150, and display device 170 may include and/or be any of a general purpose device such as a computer or a special purpose device such as a client, a server, and/or any other suitable device. Any of these general or special purpose devices may include any suitable components such as a hardware processor (which may be a microprocessor, digital signal processor, a controller, and/or any other suitable hardware processor), memory, communication interfaces, display controllers, input devices, and/or any other suitable components. For example, each of processing device 130, image acquisition device 150, and display device 170 may be implemented as or include a personal computer, a tablet computer, a wearable computer, a multimedia terminal, a mobile telephone, a gaming device, a set-top box, a television, and/or any other suitable device. Moreover, each of processing device 130, image acquisition device 150, and display device 170 may comprise a storage device, which may include a hard drive, a solid state storage device, a removable storage device, and/or any other suitable storage device. Each of processing device 130, image acquisition device 150, and display device 170 may be located at any suitable location. Each of processing device 130, image acquisition device 150, and display device 170 may be implemented as a stand-alone device or integrated with other components of system 100.

Figure 2:
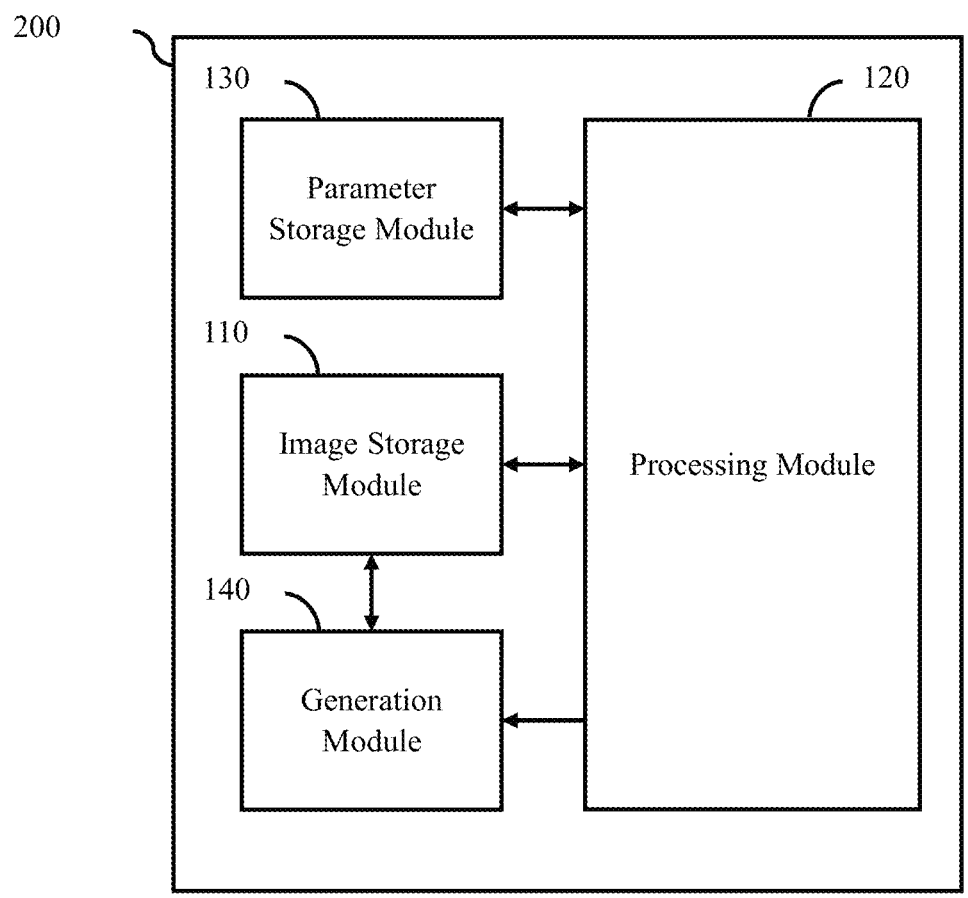
FIG. 2 is a block diagram illustrating an example of a processing device for processing images in accordance with some embodiments of the disclosure.

Referring to FIG. 2, a block diagram of an example 200 of a processing device for processing images in accordance with some embodiments of the disclosed subject matter is shown. As illustrated, processing device 200 may include an image storage module 110, a processing module 120, a parameter storage module 130, a generation module 140, and/or any other suitable component for processing images in accordance with some embodiments of the disclosed subject matter. More or less components may be included in processing device 200 without loss of generality. For example, two of the modules may be combined into a single module, or one of the modules may be divided into two or more modules. In one implementation, one or more of the modules may reside on different computing devices (e.g., desktops, laptops, mobile phones, tablet computers, wearable computing devices, etc.). In some embodiments, processing device 200 may be and/or include processing device 130 as described above in connection with FIG. 1. As an example, processing device 200 may be connected to one or more components of system 100 (e.g., an image acquisition device 110, an image display device 170, etc.) and/or any other device. The connection may be a wired connection (e.g., a connection via universal serial bus (USB), a FireWire (IEEE 1394a or 1394b), an ultra-high speed (UHS) bus, a coaxial cable, a twisted pair cabling, an optical fiber, etc.), a wireless connection (e.g., a wireless connection via wireless local area network (WLAN) as defined in the IEEE (the Institute of Electrical and Electronics Engineers) 802.11 standards, cellular networks (GSM, 2G, 3G, 4G-LTE, etc.), near field communication (NFC), Bluetooth, etc.), or any other connection that may be used to facilitate data transfer between the image enhancement system and its upstream or downstream partner. In some embodiments, the connection between the system 100 and the acquisition device 150 may be different from that between the system 100 and the display device 170.

The image storage module 110 may be and/or include any device that is capable of storing image data and/or any other suitable data, such as a magnetic storage medium, an optical storage medium, a magneto-optical storage medium, read only memory (ROM), random access memory (RAM), erasable programmable memory, flash memory, solid state memory, a disk drive, a network drive, a database, a server, and/or any other suitable storage device. Examples of image data may include one or more images (e.g., still images, moving images, etc.), histograms of the images, information about gray-levels, intensities, etc. about the pixels, etc. In some embodiments, the image storage module 110 may store image data about images provided by the image acquisition device(s) 110.

The processing module 120 may receive image data from the image storage module 110 and/or any other device. The processing module may then construct histograms based on the image data. For example, the processing module 120 may construct a 2D histogram for an input image with its parameters and a 2D distribution function which may be used to model the 2D histogram. A user may provide one or more inputs to adjust the image. The present system may include a parameter storage module 130 that may be configured to receive, process, store, etc. one or more parameters that can be used to perform image processing in accordance with various embodiments of the present disclosure. One or more of the parameters may be provided by a user (e.g., via an input device such as a keyboard, mouse, touchscreen, microphone, stylus, etc.), one or more components of system 100 and/or processing device 200 and/or any other device. The parameters may include one or more parameters indicative of intensity information (e.g., one or more gray-levels, an average gray-level, etc.), contrast information, and/or any other information about an input image. The parameters stored in parameter storage module 130 may also include one or more parameters that may be used to model a histogram of an enhanced image and/or to generate the enhanced image based on the input image (also referred to herein as the "adjustment parameters"). As will be discussed in more detail below, the adjustment parameters may include one or more parameters indicative of brightness, contrast, and/or any other information of the enhanced image. One or more of the adjustment parameters may be determined based on one or more user inputs, an adaptive algorithm, and/or in any other manner. The adjustment parameters may be provided to the processing module to adjust the shape of the 2D distribution function.

The processing module uses the 2D histogram and 2D distribution function to solve a mapping rule to manipulate intensity levels in the input image. The mapping rule may be sent to a generation module 140. The generation module 140 may generate an enhanced image for the input image based on the mapping rule. For example, the generation module 140 can transform the intensity of each pixel in the input image according to the mapping rule. In some embodiments, the enhanced image may outputted to a display device 170 or any other device for presentation. Alternatively or additionally, the enhanced image may be supplied to any other device for further processing.

Figure 3:
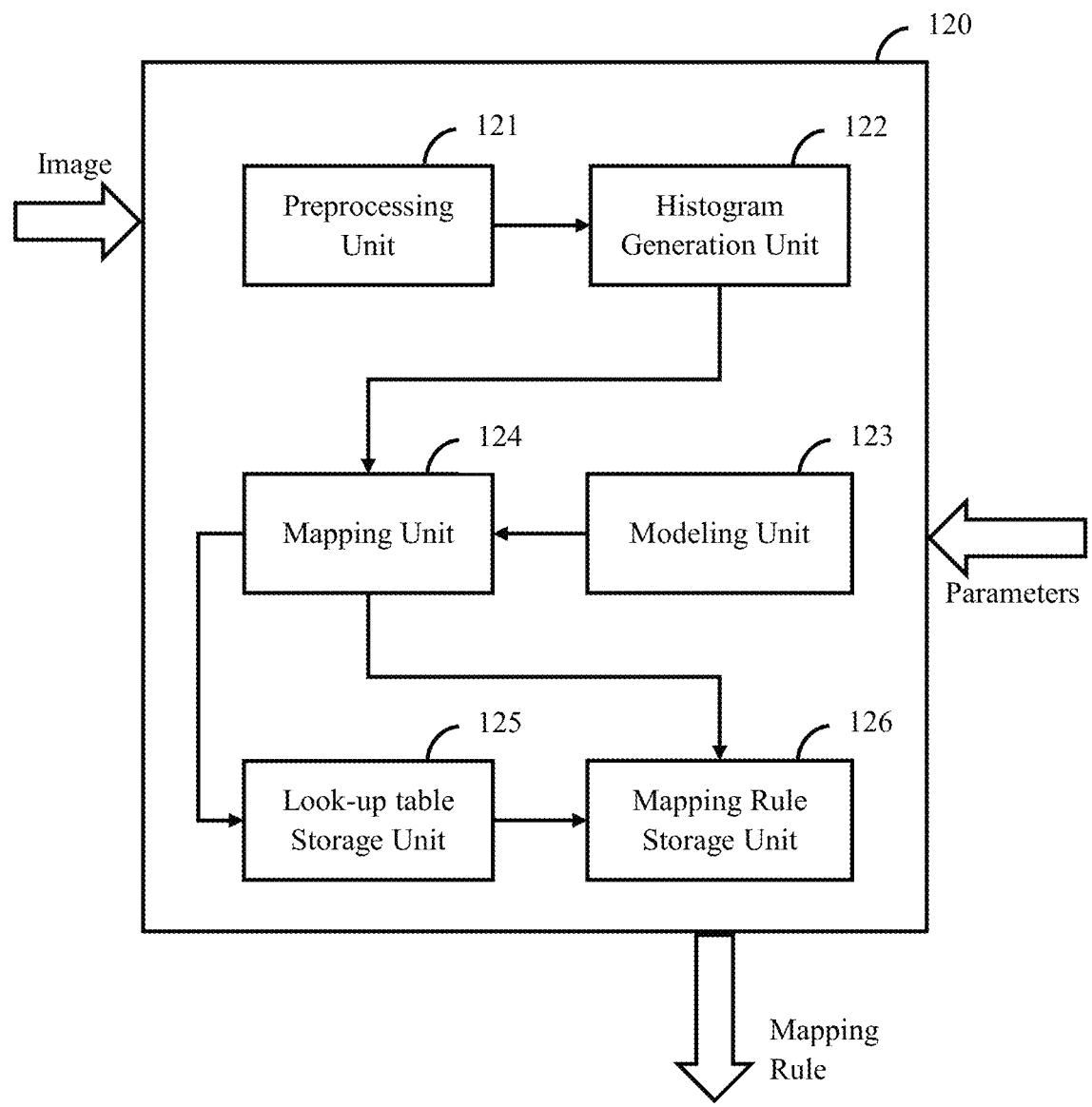
FIG. 3 is a block diagram illustrating an example of a processing module in accordance with some embodiments of the present disclosure.

FIG. 3 is a block diagram illustrating an example of a processing module 120 in accordance with some implementations of the disclosure. As illustrated, processing module 120 may include a preprocessing unit 121, a histogram generation unit 122, a modeling unit 123, a mapping unit 124, a look-up table storage unit 125, a mapping rule storage unit 126, and/or any other suitable component for processing images in accordance with some embodiments of the disclosure.

The preprocessing unit 121 may receive and process one or more images (e.g., still images, moving images, etc.). One or more of the images may be produced by an image acquisition device (e.g., image acquisition device 150) and/or any other device. In some embodiments, the images may be received from the image storage module 110 as described above in connection with FIG. 2. The preprocessing unit 121 may process the images to generate one or more preprocessed images. The preprocessed images may be generated using any image processing technique or combination of techniques, such as one or more of lens distortion correction, spherical aberration correction, coma correction, astigmatism correction, chromatic aberration correction, defocus correction and lens tilt calibration, white-balance calibration, noise reduction, deblurring, edge detection, high dynamic range (HDR) processing, shake reduction, image compression, and/or any other image processing technique. In some embodiments, the preprocessing unit 121 may output the preprocessed image(s) and/or may transmit the preprocessed image(s) to the histogram generation unit 122 or any other component of processing module 120 for further processing.

The histogram generation unit 122 may receive one or more images and may construct histograms for the images. The images may be received from, for example, the image storage module 110, the preprocessing unit 121, and/or any other device. In some embodiments, upon receiving an input image, the histogram generation unit 122 may generate a multidimensional histogram (e.g., a two-dimensional (2D) histogram) for the input image based on contextual information related to pixels in the input image. As will be discussed in more detail in connection with FIGS. 6 and 8-9, contextual information related to a given pixel of the image may be determined based on information about pixels within a region of the image that represents a neighborhood window around the given pixel (also referred to herein as the "neighboring pixels"). Such information may include, for example, gray levels of the neighboring pixels, a distance between a neighboring pixel and the given pixel, positional information about the neighboring pixels (e.g., spatial locations of the neighboring pixels defined by one or more coordinates), etc. The region of the image may include one or more neighboring pixels that may or may not connect to the given pixel. A neighboring pixel may connect to the given pixel in any direction, such as a vertical direction, a horizontal direction, an oblique direction, etc.

For example, in a 8×8 grayscale image, the gray levels of pixels located at coordinates (6,7) and (7,7) constitute one element in the contextual information of the whole image. To utilize such contextual information, a two-dimensional (2D) histogram is proposed to deal with the local contextual information for each pixel in the image. For each gray-level of the input image, the distribution of other gray-levels in the neighborhood of the corresponding pixel is counted and the correlation between a pair of gray-levels may be illustrated using a 2D histogram.

Figure 4:
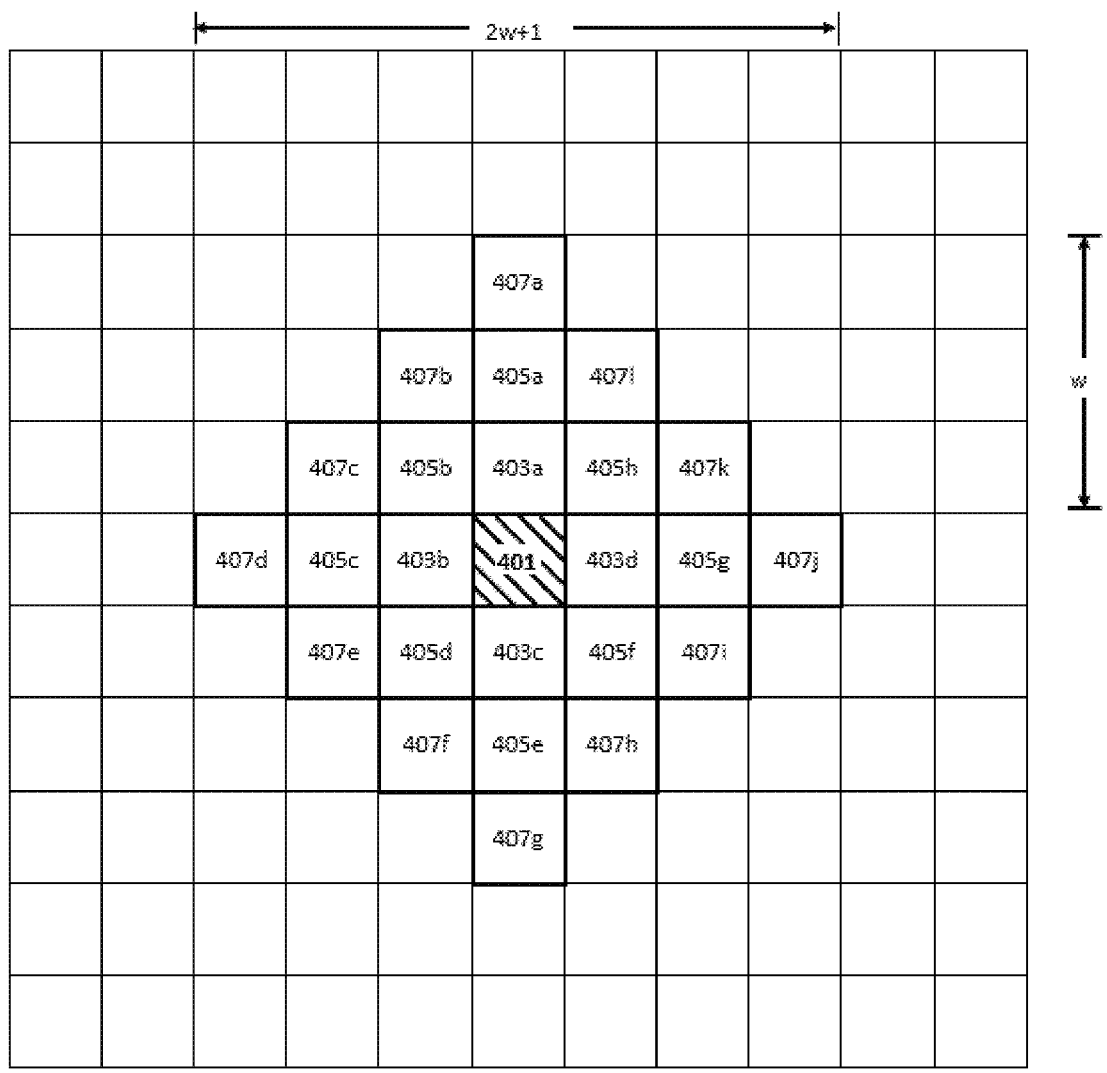
FIG. 4 is a diagram illustrating an example of a neighborhood window surrounding a pixel in accordance with some embodiments of the present disclosure.

The histogram generation unit 122 may identify a portion of the image that represents a neighborhood window around a given pixel in any suitable manner. For example, the portion of the image may have any suitable shape, such as a cross-like shape, square, rectangular, diamond, and/or any other suitable shape. In some embodiments, the portion of the image may be centered at the given pixel. The portion of the image may or may not include the given pixel. As another example, the portion of the image may have any suitable size (e.g., a particular number of pixels), such as 1 pixel, 4 pixels (e.g., 1×4 pixels, 2×2 pixels, 4×1 pixels, etc.), 9 pixels (e.g., a 3×3 square of pixels), 24 pixels, 7 pixels, etc. In a more particular example, as shown in FIG. 4, a neighborhood window surrounding a pixel 401 may be and/or include a diamond neighborhood window including 24 pixels (e.g., pixels 403a, 403b, 403c, 403d, 405a, 405b, 405c, 405d, 405e, 405f, 405g, 405h, 407a, 407b, 407c, 407d, 407e, 407f, 407g, 407h, 407i, 407j, 407k, and 407l). Each of these pixels may be regarded as being a neighboring pixel of pixel 401. These pixels may be grouped into one or more layers surrounding pixel 401. In some embodiments, the number of the layers may be denoted as w. As illustrated in FIG. 4, the neighboring pixels may be divided into three layers, such as a first layer including neighboring pixels 403a-d, a second layer including neighboring pixels 405a-h, and a third layer including neighboring pixels 407a-l.

The shape and size of a neighborhood window may be specified based on default parameters, user inputs (e.g., user inputs received via an input interface such as a virtual keyboard displayed on a touch-sensitive screen, a physical keyboard, etc.), information about the input image (e.g., intensity information, the size of the input image, the shape of the image, etc.). An input image may be processed using one or more neighborhood windows (e.g., neighborhood windows of the same or different shapes, sizes, etc.).

In some embodiments, one or more histograms may be generated for an input image based on contextual information of each pixel in the input image. For example, the histogram generation unit 122 can process the pixels in the input image iteratively by applying a neighborhood window to each pixel of the input image and determining contextual information accordingly. The pixels in the input image may be processed in any suitable order (e.g., a raster order, a vertical raster scan order, a horizontal scan order, a diagonal scan order, etc.).

More particularly, for example, the histogram generation unit 122 may select a first pixel of the image as a current pixel to be processed and may determine a neighborhood window surrounding the first pixel. The first pixel may be any pixel in the image. The first pixel may or may not be the geometric center of the neighborhood window. The first pixel may or may not be included in the neighborhood window. The histogram generation unit 122 can then determine contextual information about the first pixel. For example, intensity values of the neighboring pixels in the neighborhood window may be determined, sorted, recorded, and/or processed in any other manner. Upon processing the first pixel, the histogram generation unit 122 can select a second pixel of the input image as the current pixel to be processed. The second pixel can be any pixel in the input image that is different from the first pixel. The histogram generation unit 122 can then determine contextual information about the second pixel by applying a neighborhood window around the second pixel. As such, the histogram generation unit 122 can process each pixel of the input image iteratively.

The pixels in the input image may be processed using the same or different neighborhood windows. In some embodiments, the histogram generation unit 122 may define a neighborhood window (e.g., a square neighborhood of (2w+1)×(2w+1) centered at a given pixel) and may apply the neighborhood window for each pixel in the input image.

In some embodiments, an input image received by the histogram generation unit 122 may have a certain number of pixels (e.g., H×W pixels). Each of the pixels may correspond to a gray-level. The input image may be represented as $X=\{x(i, j)|1 \le i \le H, 1 \le j \le W\}$, where $x(i, j)$ denotes the gray-level of a pixel defined by a horizontal coordinate x and a vertical coordinate y; and $x(i, j) \in [0, Z^+]$. In some embodiments, the gray-levels may fall within a range between a minimum gray-level and a maximum gray-level (e.g., a range defined as $x(i, j) \in [x_d, x_u]$).

Upon receiving the input image, the histogram generation unit 122 may determine one or more gray-levels corresponding to the pixels of the input image. Additionally, the histogram generation unit 122 may sort the gray-levels of the pixels. More particularly, for example, K distinct gray-levels of an input image X may be represented as $X=\{x_1, x_2, \ldots, x_K\}$, where $x_1 < x_2 < \ldots < x_K$, $x_1 = x_d$, $x_K = x_u$. In some embodiments, the input image X may be an image in a color space that has L gray levels.

Figure 6:
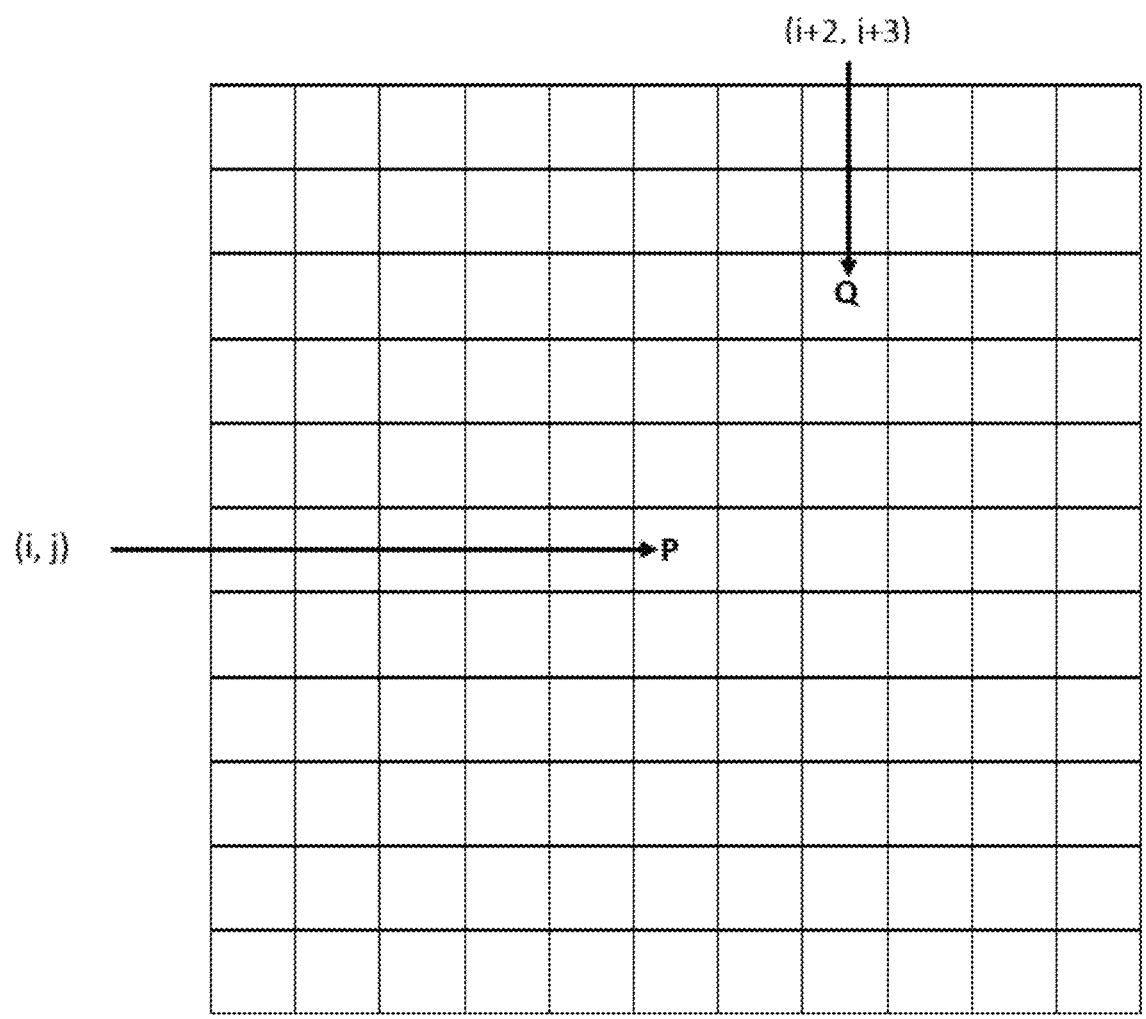
FIG. 6 is a diagram illustrating a given pixel and a neighboring pixel located in a neighborhood window surrounding the given pixel in accordance with some embodiments of the present disclosure.

In some embodiments, the histogram generation unit 122 may generate one or more histograms for an input image based on contextual information related to one or more pixels of the input image. For example, the histogram generation unit 122 may construct a 2D histogram for image X based on equations (1) and (2):

$$H_x^\circ(m, n) = \{h_x^\circ(m, n) \mid 1 \le m \le K, 1 \le n \le K\} \quad (1)$$

$$h_x^\circ(m, n) = \sum_{\forall i} \sum_{\forall j} \sum_{k=-w}^{w} \sum_{l=-w}^{w} \phi_{m,n}(x(i, j), x(i+k, j+l))(|x_m - x_n| + 1) \quad (2)$$

where w is a positive integer number used to define a dimension of a (2w+1)×(2w+1) neighborhood window around a given pixel (e.g., a window shown in FIGS. 4-6); $x_m$, and $x_n$ are the mth gray level and nth gray level in set X, respectively. In some embodiments, w may be any natural number, such as 0, 1, 2, 3, 4, etc. Specifically, when w equals to 0, the 2D histogram for image X is degraded to a 1D histogram.

In some embodiments, the histogram generation unit 122 may define a neighborhood window that has a particular size and/or that include a particular number of neighboring pixels around the given pixel by adjusting the value of w. For example, a greater value of w may be used to define a larger neighborhood window while a smaller value of w may be used to define a smaller neighborhood window (e.g., a window that is restricted to the local area). As another example, the histogram generation unit 122 may define a neighborhood window containing no neighboring pixel by adjusting the value of w to zero. In such an example, the 2D histogram may be degraded to a 1D histogram.

In equation (2), $\phi_{m,n}$, (x(i, j), x(i+k, j+l)) is a binary function that may be used to identify the occurrences of the gray-levels $x_m$, and $x_n$ at the spatial locations of (i, j) and (i+k, j+l), respectively. The value of $\phi_{m,n}$(x(i, j), x(i+k, j+l)) represents a correlation between a pair of pixels located at (i, j) and (i+k, j+l). In some embodiments, $\phi_{m,n}$(x(i, j), x(i+k, j+l)) may be determined based on the following equation:

$$\phi_{m,n}(x(i, j), x(i+k, j+l)) = \begin{cases} 1, & \text{if } x_m = x(i, j) \text{ and } x_n = x(i+k, j+l); \\ 0, & \text{otherwise.} \end{cases} \quad (3)$$

In equation (2), the entry $h_x^\circ(m,n)$ may indicate the number of occurrences of the nth gray-level ($x_n$) in the neighborhood of the mth gray-level ($x_m$) weighted by a weighting factor. The weighting factor may be determined based on a difference between the nth gray-level and the mth gray-level, such as an absolute difference between the nth gray-level and the mth gray-level, a squared difference between the nth gray-level and the mth gray-level, etc. For example, as illustrated in equation (2), a weighting factor may be assigned to a neighboring pixel based on an absolute difference between the nth gray-level and the mth gray-level (e.g., $|x_m-x_n|+1$). One (1) or any other suitable value may be added to the absolute difference to avoid giving a weight factor of "0" to occurrence of $x_m=x_n$. In some embodiments, the histogram generation unit 122 may assign a greater weighting factor to an entry of the 2D histogram that is associated with a greater difference between $x_m$, and $x_n$ The weighting factor may be determined based on the combinations of $x_m$, and $x_n$ according to the differences between them. FIG. 6 is an exemplary diagram illustrating a pair of pixels in an image. As shown, pixel P may correspond to coordinate (i, j) and may have a gray-level of the value x(i, j). Pixel Q may be a pixel located in a neighborhood window surrounding pixel P. In some embodiments, pixel Q may correspond to coordinates (i+2, j+3) and may have a gray-level of the value x(i+2, j+3). Thus a correlation between the pair of pixels may be determined based on equation (3) as follows:

$$\phi_{m,n}(x(i, j), x(i+2, j+3))=\phi_{m,n}(x(P), x(Q))=1.$$

For example, a neighborhood window may be defined as a 7×7 square without its center. The neighborhood window may include 48 ($7^2-1$) pixels. One entry in the 2D histogram may be $h_x(50, 45)=5$, meaning that for all neighborhood windows defined by a specific rule around every pixel having the intensity of 50, the occurrence of pixels having the intensity of 45 are five (5) times.

As described above, contextual information about a given pixel may be determined based on intensity information (e.g., gray-levels) about neighboring pixels of the given pixel. For example, the contextual information may be determined based on the binary function $\phi_{m,n}$(x(i, j), x(i+k, j+l)) as described in connection with equation (3). The contextual information may also be determined based on a distance between a neighboring pixel and the given pixel. For example, a weight factor may be determined based on the distance between the neighboring pixel and the given pixel. The intensity value and/or any other contextual information related to the neighboring pixel may be weighted by the weighting factor. Multiple weighting factors may be determined for multiple neighboring pixels based on distances between the neighboring pixels and the given pixel. For example, a greater weighting factor may be assigned to a neighboring pixel that is located more distant from the given pixel. As another example, a greater weight factor may be assigned to a neighboring pixel that is located closer to the given pixel. In a more particular example, as shown in FIG. 5, different weighting factors (e.g., 1.0, 0.71 and 0.50, etc.) may be assigned to the neighboring pixels according to their distances to the given pixel. In some embodiments, various weighting factors may be assigned to neighboring pixels located in various layers of a neighborhood window (e.g., the layers as described in connection with FIG. 4 above).

In some embodiments, the histogram generation unit 122 may generate a normalized 2D histogram based on the 2D histogram generated based on equations (1) and (2) (also referred to herein as the "initial 2D histogram"). The normalized 2D histogram may be determined, for example, by performing a normalization process on the initial 2D histogram. In some embodiments, the normalized 2D histogram may be generated based on the following equation:

$$h_x(m, n) = h_x^\circ(m, n) \Big/ \sum_{i=1}^{K} \sum_{j=1}^{K} h_x^\circ(i, j) \quad (4)$$

The histogram generation unit 122 may also determine a cumulative distribution for the normalized 2D histogram and/or the initial 2D histogram based on the following equation:

$$P_x = \{P_x(m) \mid m = 1, \ldots, K\} \text{ where} \quad (5)$$

$$P_x(m) = \sum_{i=1}^{m} \sum_{j=1}^{K} h_x(i, j) \quad (6)$$

The histogram generation unit 122 may also calculate one or more parameters, such as an average intensity, a standard derivation of gray levels of the input image, image contrast, color saturation, hue, sharpness, acutance which is related to the edge contrast, graininess (including but without limitation to RMS granularity, Selwyn granularity), and/or any other parameter indicative of information about the input image. One or more of the parameters may indicate information about luminance and/or intensity information of pixels in the input image. One or more of these parameters may be stored in parameter storage module 130 and/or any other device as a parameter set (also referred to herein as the first parameter set). The first parameter set may include any number of parameters about the input image.

In some embodiments, the average intensity μ and the standard derivation σ may be determined as follows, respectively:

$$\mu = \sum_{i=0}^{L-1} ip(i) \qquad (7)$$

$$\sigma = \left[\sum_{i=0}^{L-1} (i-\mu)^2 p(i)\right]^{1/2} \qquad (8)$$

In equations (7) and (8), i denotes the intensity of a certain gray level and p(i) denotes its corresponding probability.

The histogram generation unit 122 may provide the mapping unit 124 with the initial histogram, the normalized histogram, one or more parameters about the input image (e.g., the first parameter set), and/or any other information about the input image.

The processing module 120 may also include a modeling unit 123 that may construct one or more models for mapping elements of an input image to elements of an enhanced image. The model(s) may be constructed based on one or more parameters generated by the system itself, information obtained using scene-recognition or other techniques, one or more user inputs, and/or any other information that may be used to generate the model(s).

In some embodiments, an enhanced image Y may be generated based on the input image X. One or more gray-levels of the enhanced image may be determined and sorted. The gray-levels of the enhanced image (also referred to herein as the "target gray-levels") may fall within a range of a minimum gray-level (e.g., a minimum target gray-level) and a maximum gray-level (e.g., a maximum target gray-level). The range of target gray-levels may be represented as an output range of $[y_d, y_u]$. In some embodiments, L distinct gray-levels of the enhanced image may be represented as $Y=\{y_1, y_2, \ldots, y_L\}$, where $y_1<y_2<\ldots<y_L$, $y_1=y_d$, $y_L=y_u$ for an output range of $[y_d, y_u]$.

To map the elements of image X to elements of image Y, the modeling unit 123 may construct one or more models representative of a histogram of the enhanced image. For example, the model(s) may be constructed by constructing a probability distribution function and/or its cumulative histogram. In a more particular example, the modeling unit 123 may form one or more probability distribution functions that have two independent variables to model the 2D histogram in an enhanced image. In another more particular example, the modeling unit 123 may form a Cauchy distribution function (also known as Lorentzian function), a polynomial function, a bivariate exponential function, a constant function (e.g., f(x, y)=K), and/or any other probability distribution function generated by curve fitting programs. In some embodiments, one or more probability distribution functions may be formed based on one or more user inputs, computer-implemented methods, etc.

The 2D target probability distribution function may be determined as follows:

$$H_t = \{h_t(m', n') = f(x, y) | 1 \leq m' \leq L, 1 \leq n' \leq L\} \qquad (9)$$

where L is the number of the distinct gray-levels in range $[y_d, y_u]$. The cumulative distribution function may then be calculated using equation (9).

As an example, the processing module 120 may use a two-dimensional Gaussian function to model a 2D histogram of the enhanced image. More particularly, for example, the two-dimensional Gaussian function as shown in equation (10) may be used:

$$f(x, y) = \frac{1}{2\pi\sigma_x\sigma_y\sqrt{1-r^2}} e^{-\frac{1}{2(1-r^2)}\left[\frac{(x-\mu_x)^2}{\sigma_x^2} - \frac{2r(x-\mu_x)(y-\mu_y)}{\sigma_x\sigma_y} + \frac{(y-\mu_y)^2}{\sigma_y^2}\right]} \qquad (10)$$

where $$\sum_{i=1}^{L}\sum_{j=1}^{L} f(i, j) = 1 \qquad (11)$$

In equation (10), $\mu_x$ and $\mu_y$ are the expectations of the two variables x and y, respectively; $\sigma_x$ and $\sigma_y$ are their standard derivations, respectively; and r is the correlation coefficient of x and y having a range of $0 \leq r < 1$. The Gaussian function is restricted since it may be normalized as the summation of its values equals to 1, as illustrated in equation (11). Further, a simple 2D Gaussian function sets r to 0, which means that the two variables may be independent.

Figure 7:
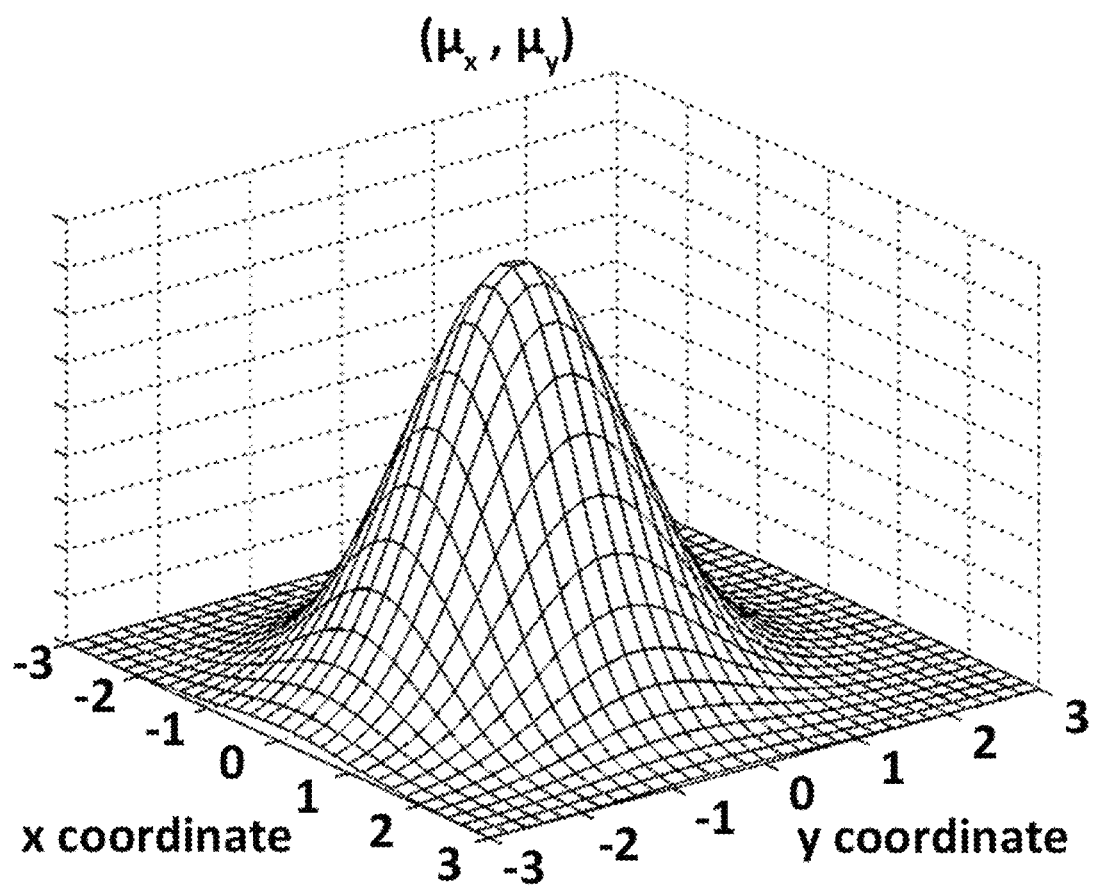
FIG. 7 is a graph showing an example of a distribution model that may be used to generate an enhanced image in accordance with some embodiments of the present disclosure.

In a more particular example, 2D Gaussian function curve as illustrated in FIG. 7 may be constructed to generate the enhanced image. As illustrated, the 2D Gaussian function curve reaches its peak at $(\mu_x, \mu_y)$. Around the peak, the curve descends quickly as the distance to the peak becomes further. At points which are far away from the peak, the curve is closed to the ground.

To model the 2D histogram of the enhanced image, a 2D Gaussian function is utilized with its $\mu_x$ as the average gray level and $\sigma_x$ as an approximation of the contrast. The resulting 2D Gaussian function is also referred to herein as the "target Gaussian function."

The modeling unit 123 may also determine a target cumulative distribution function based on the target Gaussian function. For example, the target cumulative distribution may be determined based on the following equations:

$$P_t = \{P_t(m') | m' = 1, \ldots, L\} \qquad (12)$$

$$P_t(m') = \sum_{i=1}^{m'}\sum_{j=1}^{L} h_t(i, j) \qquad (13)$$

$$= \sum_{i=1}^{m'}\sum_{j=1}^{L} f(i, j)$$

$$= \sum_{i=1}^{m'}\sum_{j=1}^{L} \frac{1}{2\pi\sigma_x\sigma_y\sqrt{1-r^2}}$$

$$e^{-\frac{1}{2(1-r^2)}\left[\frac{(i-\mu_x)^2}{\sigma_x^2} - \frac{2r(i-\mu_x)(j-\mu_y)}{\sigma_x\sigma_y} + \frac{(j-\mu_y)^2}{\sigma_y^2}\right]}$$

The target Gaussian function and its cumulative distribution function may be solved based on one or more adjustment parameters $\mu_x$, $\mu_y$, $\sigma_x$, $\sigma_y$, etc. One or more of the adjustment parameters may be determined based on user inputs, default setting, and/or any other information.

In equation (13), parameters $\mu_x$ and $\mu_y$ are mathematical expectations of the two-dimensional Gaussian function and may indicate the average gray-levels of the enhanced image. Parameters $\sigma_x$ and $\sigma_y$ are mean square deviations and may indicate the approximate values of the gray-level contrast of the enhanced image. In particular, the histogram of output image may be stipulated by setting one or more of expected average gray-levels $\mu_x$ and $\mu_y$ and expected gray-level contrast $\sigma_x$ and $\sigma_y$. In some embodiments, these parameters may be determined based on one or more of the following equations:

$$\mu_x = \alpha_x \mu \quad (14)$$

$$\mu_y = \alpha_y \mu \quad (15)$$

$$\sigma_x = \beta_x \sigma \quad (16)$$

$$\sigma_y = \beta_y \sigma \quad (17)$$

The four equations relate information about the brightness ($\mu$) and contrast ($\sigma$) of the input image as defined in equations (7) and (8) to information about the brightness and contrast of the output image. In equations (14)-(17), $\alpha_x$ and $\alpha_y$ are coefficients that control mathematical expectation of the gray level values (e.g., the average brightness of the output image). $\beta_x$ and $\beta_y$ are coefficients that may control the mean square deviation of the output image histogram. Different values of $\alpha_x$ and $\alpha_y$ may be chosen for controlling the brightness of the output image while different $\beta_x$ and $\beta_y$ may be chosen for controlling the contrast of the output image. In addition, as described above, a parameter "W" may be assigned to adjust the size of the neighborhood window. Each of these parameters may be set manually, automatically calculated, or in any other manner. One or more of these adjustment parameters may be constituents of an adjustment parameter set including one or more parameters that can be used to determine the shape and properties of the modeling function and control the specified histogram. The adjustment parameter set may also include any other parameter indicative of other characteristics of an image. The adjustment parameter set may include any number of parameters.

To provide further illustration, if an image with roughly the same brightness as the input image is desired, the parameters $\alpha_x$ and $\alpha_y$ may be set to "1." Each of parameters $\alpha_x$ and $\alpha_y$ may set to a certain value (e.g., a value that is greater than "1") to increase of overall lightness of the enhanced image. If an image with a higher contrast is desired, parameters $\beta_x$ and/or $\beta_y$ may be set to a value that is greater than "1." One or more of parameters $\alpha_x$, $\alpha_y$, $\beta_x$, and $\beta_y$ may also be generated using a self-adaptive algorithm. For example, when the overall brightness of the input image is relatively low (e.g., the value of $\mu_x$ being smaller than a preset threshold, such as 128 or any other predetermined value), relatively greater values may be assigned to $\alpha_x$ and/or $\alpha_y$. For example, $\alpha_x$ and/or $\alpha_y$ may be set to values that are greater than one (1). When the overall brightness of the input image is relatively high (e.g., the value of $\mu_x$ being greater than a preset threshold, such as 128 or any other preset value), relatively smaller values may be assigned to $\alpha_x$ and $\alpha_y$. For example, $\alpha_x$ and $\alpha_y$ may be set to values that are smaller than one (1). It should be noted that the preset threshold equaling to 128 is an example only, it may be set to be any possible value according to the content of an image.

In some embodiments, one or more of expected brightness $\mu_x(e)$ and $\mu_y(e)$ or values of expected contrast $\sigma_x(e)$ and $\sigma_y(e)$ may be provided by a user and/or determined by a processor. One or more of parameters $\alpha_x$, $\alpha_y \beta_x$, and $\beta_y$ may be calculated in an adaptive manner. For example, one or more of these parameters may be determined based on the following equations: $\alpha_x = \mu_x(e)/\mu$, $\alpha_y = \mu_y(e)/\mu$, $\beta_x = \sigma_x(e)/\sigma$, $\beta_y = \sigma_y(e)/\sigma$.

Further, when $\alpha_x$ and $\alpha_y$ are approximately $\frac{128}{\mu}$ and the values of $\beta_x$ and $\beta_y$ are great enough (e.g., the values of $\beta_x$ and/or $\beta_y$ being greater than a preset threshold), the 2D Gaussian function may be approximate by a linear function. Thus, the 2D Gaussian histogram specification may degrade to a histogram equalization.

In some embodiments, parameters $\alpha_x$ and $\alpha_y$ may be set to 1. Parameters $\beta_x$ and $\beta_y$ may be set to the same value (e.g., $\beta_x = \beta_y = \beta$).

In some embodiments, the modeling unit 123 may construct a model representative of a histogram of the enhanced image using a bivariate Cauchy distribution function. For example, the Cauchy distribution function may be represented as follows:

$$f(x, y; x_0, y_0, \gamma) = \frac{1}{2\pi}\left[\frac{\gamma}{((x-x_0)^2 + (y-y_0)^2 + \gamma^2)^{3/2}}\right] \quad (18)$$

where parameters $x_0$, $y_0$ and $\gamma$ are related to the expectation and standard derivation of the statistical distribution.

Although a single bivariate function is used to fit the 2D histogram, this is merely illustrative. A series or an integral of bivariate functions may also be utilized to fit the discrete 2D histogram. For example, the modeling function may be a Fourier transform, a wavelet transform and the like. Also, the fitting of the 2D histogram may be conducted once, or several times in which an iterative or adaptive fitting scheme may be implemented.

The mapping unit 124 may develop one or more mapping rules and may transform elements (e.g., gray-levels, intensities, etc.) of the input image to elements of the enhanced image (e.g., gray-levels, intensities, etc.) based on the mapping rule(s). For example, the mapping unit 124 may determine a mapping rule that maps a gray-level of the input image (e.g., an input gray-level) to a gray-level of the enhanced image (e.g., a target gray-level) based on a cumulative distribution function corresponding to the input image and a cumulative distribution function corresponding to the enhanced image. More particularly, for example, during the mapping, the cumulative probability of intensity values in the input image that are not greater than the input gray-level (e.g., the m th input gray-level) may be regarded as being the same as the cumulative probability of intensity values in the enhanced image that are not greater than the target gray-level (e.g., the m'th input gray-level). This mapping rule may be expressed as follows:

$$P_x(m) = P_t(m') \quad (19)$$

An input gray-level $x_m$ may also be mapped to a target gray-level $y_m$, by solving an optimization problem. For example, an index m' of the target gray-level may be determined as being a match of index m of the input gray-level by solving the following optimization problem:

$$m' = \underset{i \in \{1,2,\ldots,L\}}{\operatorname{argmin}} |P_x(m) - P_t(i)| \quad (20)$$

In some embodiments, the mapping unit 124 may construct a mapping rule by determining a cumulative distribution function of an input gray-level (e.g., $P_x(m)$) and identifying a target gray-level (e.g., a gray-level corresponding to index m') so that a cumulative probability of the target gray-level (e.g., $P_t(m')$) best matches the cumulative probability of an input gray-level. For example, the target gray-level may be identified by minimizing a difference between the cumulative probabilities. In some embodiments, the mapping rule may be constructed based on the following equation:

$$|P_x(m) - P_t(m')| = \min_k |P_x(m) - P_t(k)| \quad (21)$$

Upon determining an input gray-level and its matching target gray-level, the mapping unit 124 can provide information about the pair of input gray-level and target gray-level to look-up storage unit 125, mapping rule storage unit 126, and/or any other device for further processing. Such information may include, for example, the input gray-level (e.g., the value of $x_m$), the target gray-level (e.g., the value of $y_{m'}$), the index of the input gray-level (e.g., the value of m), the index of the target gray-level (the value of m'), etc. This information may be recorded to enable intensity manipulation for image enhancement. For example, look-up table storage unit 125 can store the values of a pair of indexes m and m' in a specially-designed lookup table (LUT) (e.g., a LUT with entry lookup(m)=m'). The lookup table may an array storing input gray-levels and their corresponding target gray-level. The lookup table can be used to transform an input gray-level into a target gray-level. Its usage can enable a simple array indexing operation and a faster generation of an enhanced image. As another example, a pair of input gray-level and target gray-level may be stored by the look-up table storage unit 125, the mapping rule storage unit 126, and/or any other device.

In some embodiments, a uniform distribution function may be used to construct a modeling function to specify the original 2D histogram. The processing module may then generate a new 2D histogram based on the uniform distribution function.

The uniform distribution function may be determined as follows:

$$f(x, y) = \frac{1}{L^2} (x \in N^+, y \in N^+, x < L, y < L) \quad (22)$$

By choosing a uniform distribution function, the 2D histogram specification degrades to a 2D histogram equalization. Using the equation above, the mapping rule between cumulative 2D histogram and the cumulative target function may be constructed as follows:

$$|P_x(m) - P_t(m')| = \min_k \left| P_x(m) - \frac{k}{L} \right| \quad (23)$$

$$L|P_x(m) - P_t(m')| = \min_k |LP_x(m) - k| \quad (24)$$

To solve the value of m', the mapping unit 124 can calculate the value of $LP_x(m)$ for each given m. The mapping unit 124 can then identify a value of k that minimizes the absolute difference of $LP_x(m) - k$. The value of k may then be assigned to m'. A mapping rule from m to m' is thus established, and a lookup table may be recorded and stored in a memory by an iterative way conducted by programmable computational units.

To give more detailed illustration of embodiments of the present disclosure, some concepts and techniques in image processing are discussed in the following paragraphs.

Figure 8:
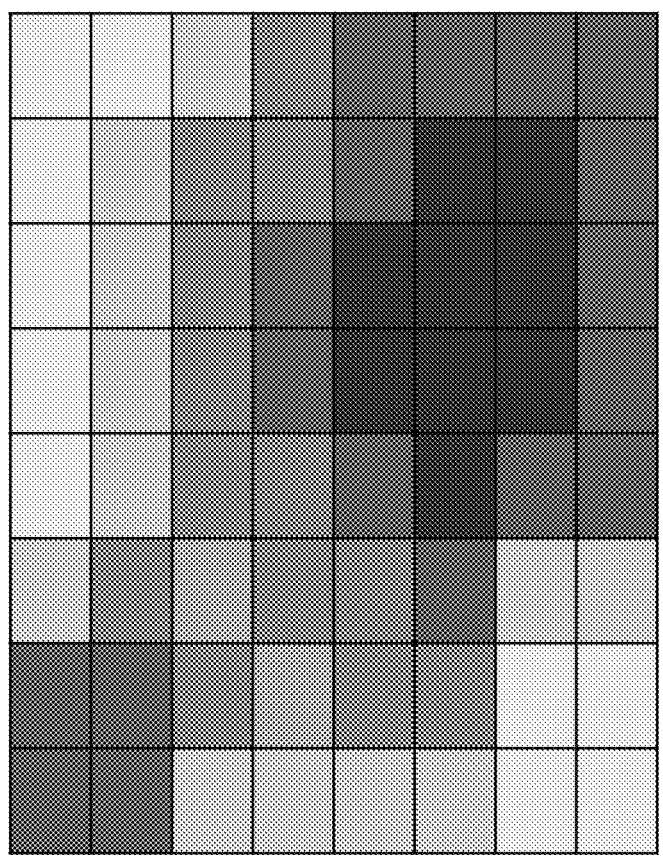
FIG. 8 shows an example of a grayscale image in accordance with some embodiments of the present disclosure.
Figure 9A:
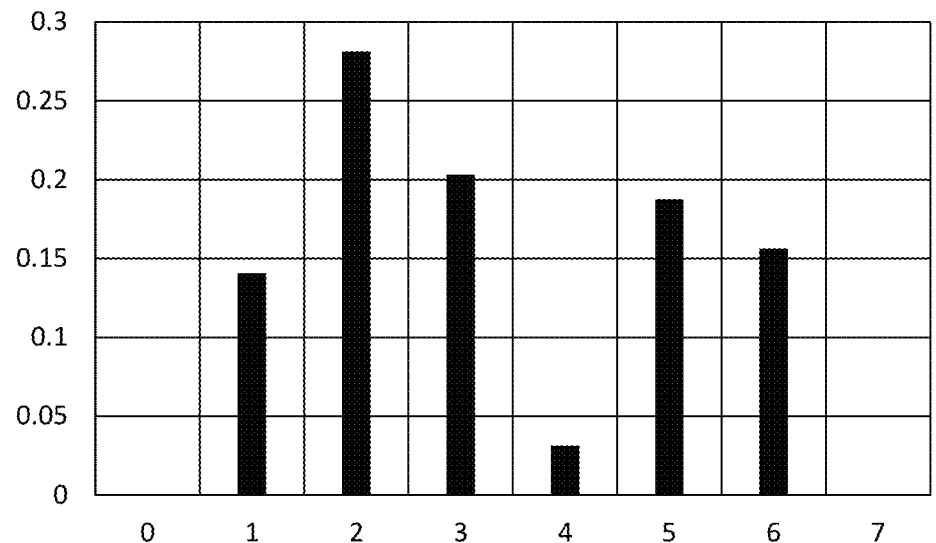
FIG. 9(A) is a graph illustrating an example of a histogram of the grayscale image shown in FIG. 8 in accordance with some embodiments of the present disclosure.
Figure 9B:
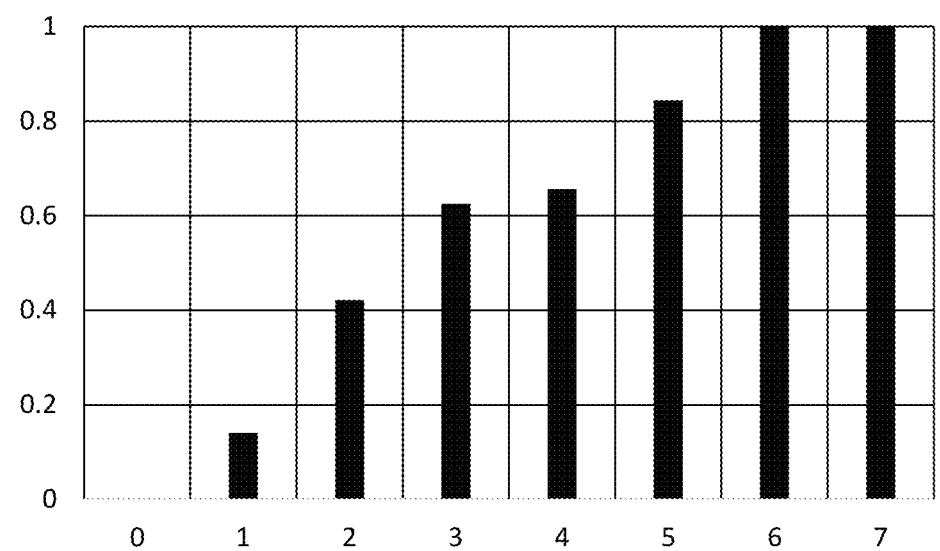
FIG. 9(B) is a graph illustrating the cumulative probability of the grayscale image in FIG. 8 in accordance with some embodiments of the present disclosure.

Referring to FIG. 9(A), which is an example of a normalized histogram of a grayscale image having 64 pixels shown in FIG. 8. The occurrence probability of different gray levels are illustrated in the vertical direction, while the intensity of gray levels are in the horizontal direction. The summation of the values of black columns makes unity (1). The normalized histogram may be transformed into a cumulative probability diagraph in FIG. 9(B). FIG. 9(B) depicts the cumulative probability against the intensity, thus the column reaches the height of unity (1) when the intensity reaches the maximal value, e.g., $7(2^3-1)$.

Figure 9C:
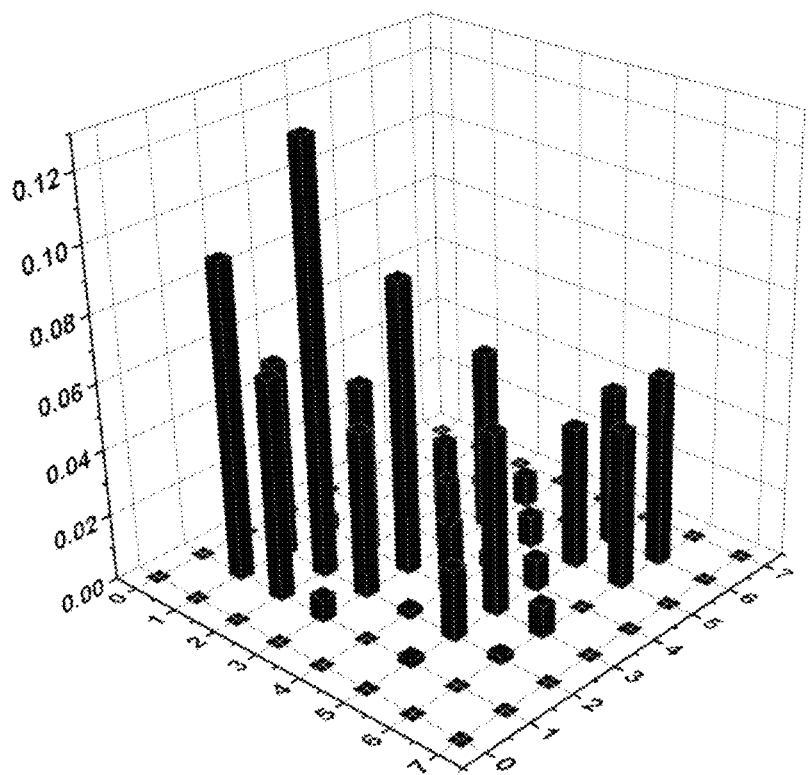
FIG. 9(C) is a graph illustrating an example of a 2D histogram of the grayscale image in FIG. 8 in accordance with some embodiments of the present disclosure.

Referring to FIG. 9(C), an example of a normalized 2D histogram of the grayscale image shown in FIG. 8 in accordance with some embodiments of the present disclosure is illustrated. In the 2D histogram, the neighborhood window is set to be a square neighborhood of 3×3 centered at a given pixel. The occurrence probability of different gray-level pairs are illustrated in the vertical direction, while the intensity of gray levels are in the two directions on the plane. The summation of the values of black columns makes unity (1).

Figure 10:
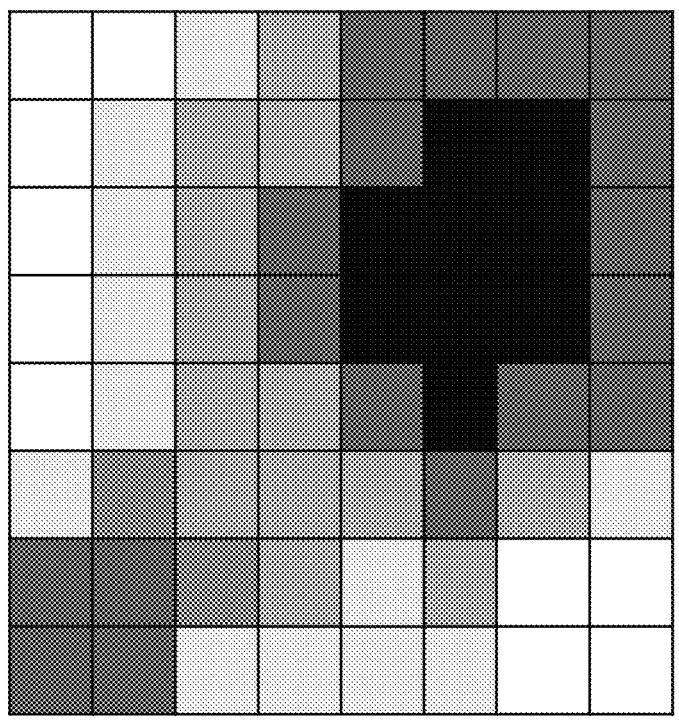
FIG. 10 shows an image generated from the histogram equalization of the grayscale image in FIG. 8.
Figure 11A:
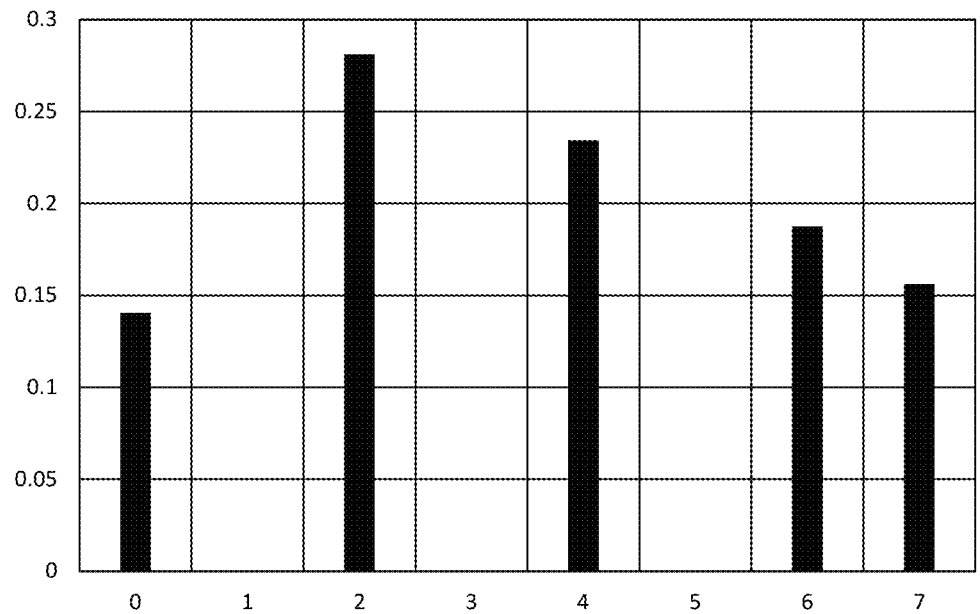
FIG. 11(A) is a graph illustrating the histogram of the grayscale image in FIG. 10.
Figure 11B:
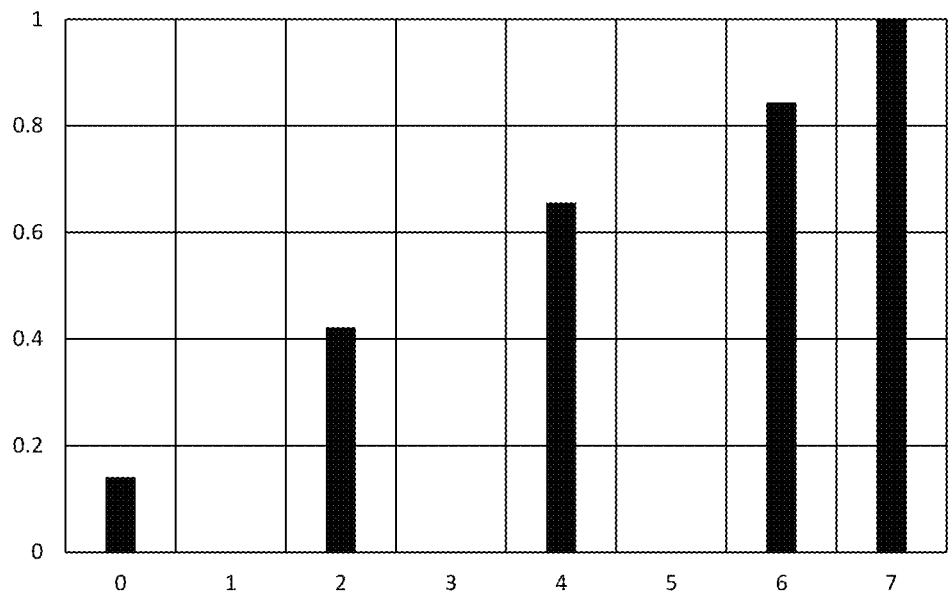
FIG. 11(B) is a graph illustrating the cumulative probability of the grayscale image in FIG. 10.

To spread the gray levels and increase the contrast, histogram equalization was performed to the image and the resulting image and its histogram, its cumulative probability diagraph are presented in FIGS. 10, 11(A), and 11(B), respectively. The output image having a minimal intensity of 0, and a maximal intensity of 7, thus its dynamical range is 8, larger than 6 of the original image. The differences in pixel intensity and the edge of two darker regions are much more obvious to human viewer. After the transformation, contrast of the image is enhanced.

Figure 12:
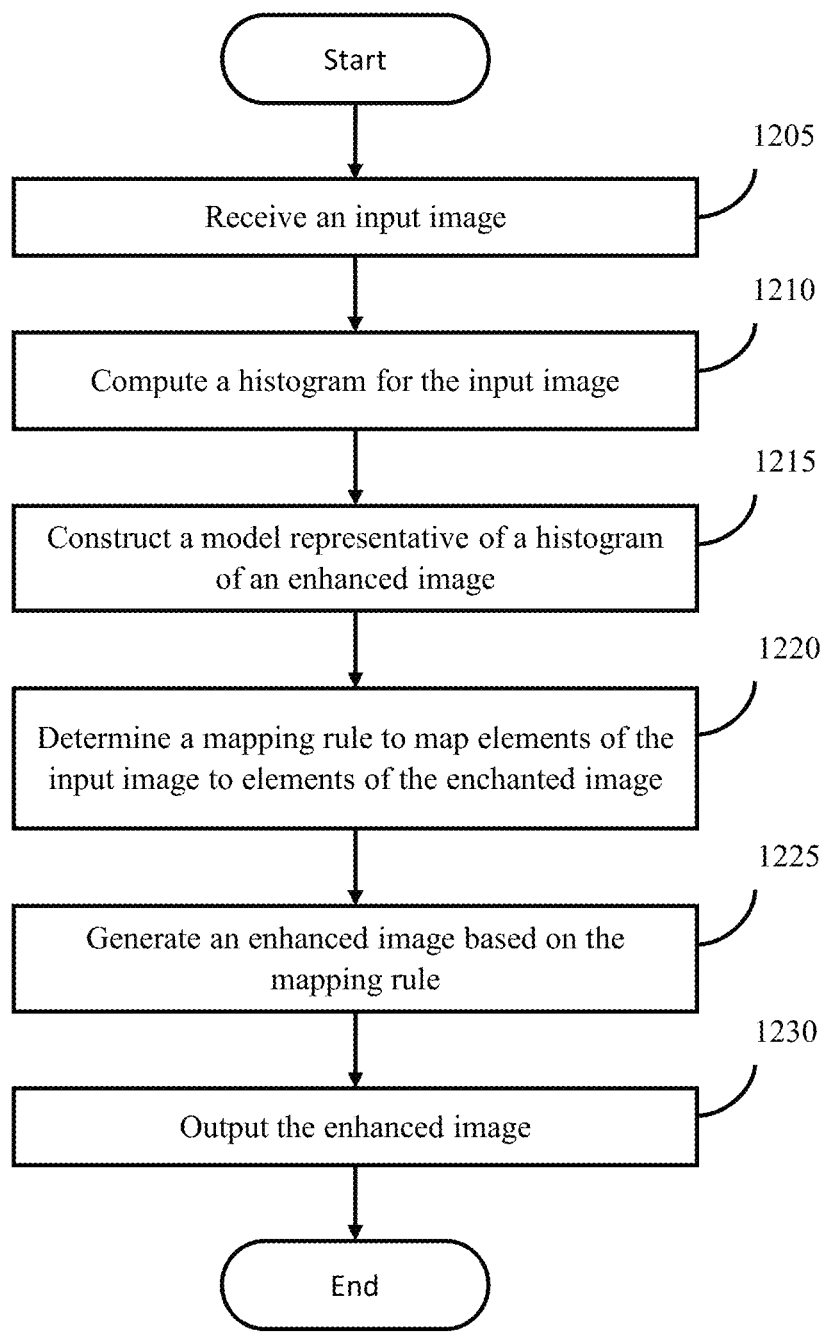
FIG. 12 is a flowchart illustrating a process for image processing in accordance with one embodiment of the present disclosure.

FIG. 12 is a flow chart illustrating an example 1200 of a process for processing images in accordance with some embodiments of the disclosed subject matter. Process 1200 may be performed by processing logic that comprises hardware (e.g., circuitry, dedicated logic, programmable logic, microcode, etc.), software (e.g., instructions run on a processing device to perform hardware simulation), or a combination thereof. In some implementations, process 1200 may be performed by a processing device 120 as described above in connection with FIGS. 1-3.

As illustrated, process 1200 may begin at block 1205 where the processing device may receive an input image. In some embodiments, the input image file may be provided by an image acquisition device (e.g., an image acquisition device 150 of FIG. 1), a storage device (e.g., the image storage module 110 of FIG. 2), and/or any other device that is capable of providing an image. The image may be of any suitable size (e.g., H×W pixels) and may have any suitable format. In some embodiments, the input image may be a grayscale image. Alternatively or additionally, a grayscale image may be generated based on the input image.

In some embodiments, the input image may be preprocessed for further processing. For example, the input image can be processed by the preprocessing unit 121 of FIG. 3 as described in connection with FIG. 3 above. In some embodiments, the input image may be a preprocessed image (e.g., an image produced by the preprocessing unit 121 of FIG. 3).

At block 1210, the processing device may construct a histogram for the input image. For example, the first histogram may be generated based on lightness information and/or any other information of the input image (e.g., gray-level values of distinct pixels in the input image, an average value of gray-levels, a standard derivation of gray level values of the input image, etc.). More particularly, for example, the first histogram may be constructed based on contextual information about the pixels in the input image. In some embodiments, contextual information about a given pixel in the input image may be determined based on gray-levels of neighboring pixels within a neighborhood window around the given pixel.

The processing device can process the pixels in the input image iteratively by applying a neighborhood window to each pixel of the input image and determining contextual information accordingly. The pixels in the input image may be processed in any suitable order (e.g., a raster order, a vertical raster scan order, a horizontal scan order, a diagonal scan order, etc.). The first histogram may be constructed by performing one or more operations described in connection with equations (1)-(4) above. In some embodiments, block 1210 may be performed by the histogram generation unit 122 of FIG. 3.

In some embodiments, the processing device can also generate a first parameter set for the input image. The first parameter set may include one or more parameters indicative of intensity and/or luminance information, contrast information, and/or any other information about the input image. For example, the first parameter set may include one or more parameters indicative of an average intensity of the input image, such as an average gray-level determined based on equation (7). As another example, the first parameter set may include one or more parameters indicative of contrast information of the input image, such as a standard deviation determined based on equation (8). The first parameter set may include any number of parameters. The parameters may or may not relate to each other.

At block 1215, the processing device may construct a model representative of a histogram of an enhanced image. The model may be determined based on one or more distribution functions that map two variables to a frequency or occurrence, such as a Cauchy distribution function (also known as Lorentzian function), a polynomial function, a bivariate exponential function, a constant function, any other function generated by curve fitting programs and so on. In some embodiments, the model may be determined based on one or more of equations (1) to (6). For example, a Gaussian modelling a Cauchy modelling. In some embodiments, block 1215 may be performed by the modeling unit 123 of FIG. 3.

In some embodiments, the model may be determined based on one or more parameters in the first parameter set, an adjustment parameter set, and/or any other information. The adjustment parameter set may include one or more parameters that may be used to construct a histogram of the enhanced image. For example, the adjustment parameter set may include one or more adjustment parameters indicative of intensity and/or luminance information (e.g., average gray-levels, etc.), contrast information, and/or any other information about the enhanced image. In some embodiments, one or more of the adjustment parameters may be adjusted by performing one or more operations described in connection with FIG. 3. The adjustment parameter set may include any number of adjustment parameters. The adjustment parameters may or may not relate to each other.

At block 1220, the processing device may determine a mapping rule that can be used to map elements of the input image to elements of the enhanced image. For example, the mapping rule may be used to map a given gray-level in the original histogram (e.g., an input gray-level) to a target gray-level in the new 2D histogram.

In some embodiments, the mapping rule may be determined based on a cumulative distribution function corresponding to the input image and a cumulative distribution function corresponding to the enhanced image. The cumulative distribution function corresponding to the input image may be determined based on the first histogram. The cumulative distribution function corresponding to the enhanced image may be determined based on the model constructed at 1215. The mapping rule may be generated based on one or more of equations (19)-(24). In some embodiments, the mapping rule may be generated by the mapping unit 124 as described in conjunction with FIG. 3 above. In some embodiments, the mapping rule may be determined by performing one or more operations described below in connection with FIGS. 13(A)-(B).

Alternatively or additionally, the mapping rule may be a predetermined rule stored in a storage device. The processing device may determine the mapping rule by retrieving the mapping rule from the storage device. In some embodiments, the predetermined mapping rule may be and/or include one or more lookup tables including mapping information that can be used to mapping one or more input gray-levels to one or more target levels.

At block 1225, the processing device may generate an enhanced image based on the mapping rule. For example, the enhanced image may be generated by transforming gray-levels of pixels in the input image (e.g., "input gray-levels") to one or more target gray-levels of pixels in the enhanced image based on the mapping rule.

At block 1230, the processing device may output the enhanced image. For example, the enhanced image may be provided to a display device (e.g., the display 170 of FIG. 1) or any other device for presentation. As another example, the enhanced image may be provided to another device for further processing.

Figure 13A:
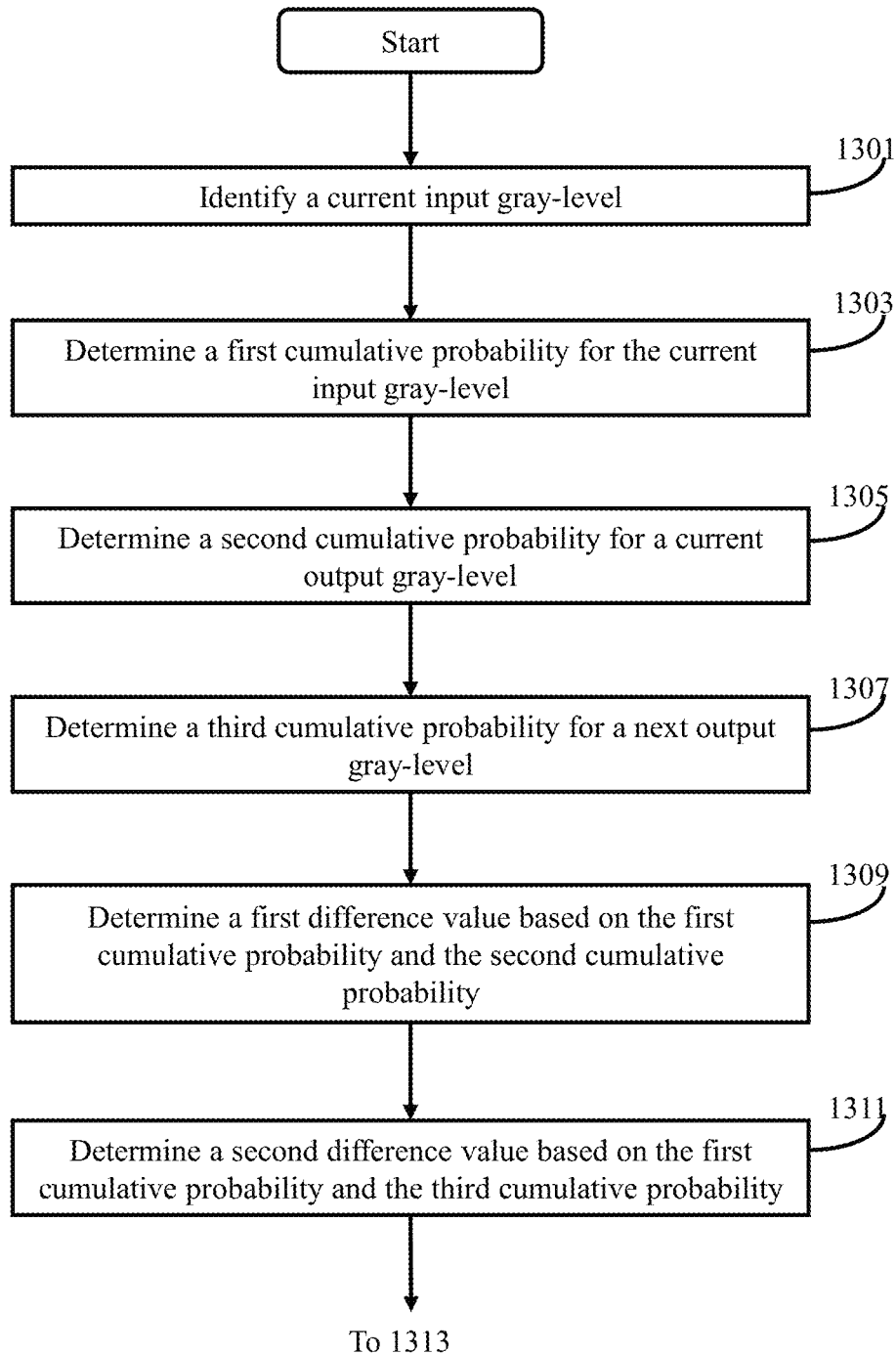
FIGS. 13(A) and 13(B) show a flowchart illustrating a process for mapping elements of an input image to elements of an output image in accordance with some embodiments of the present disclosure.
Figure 13B:
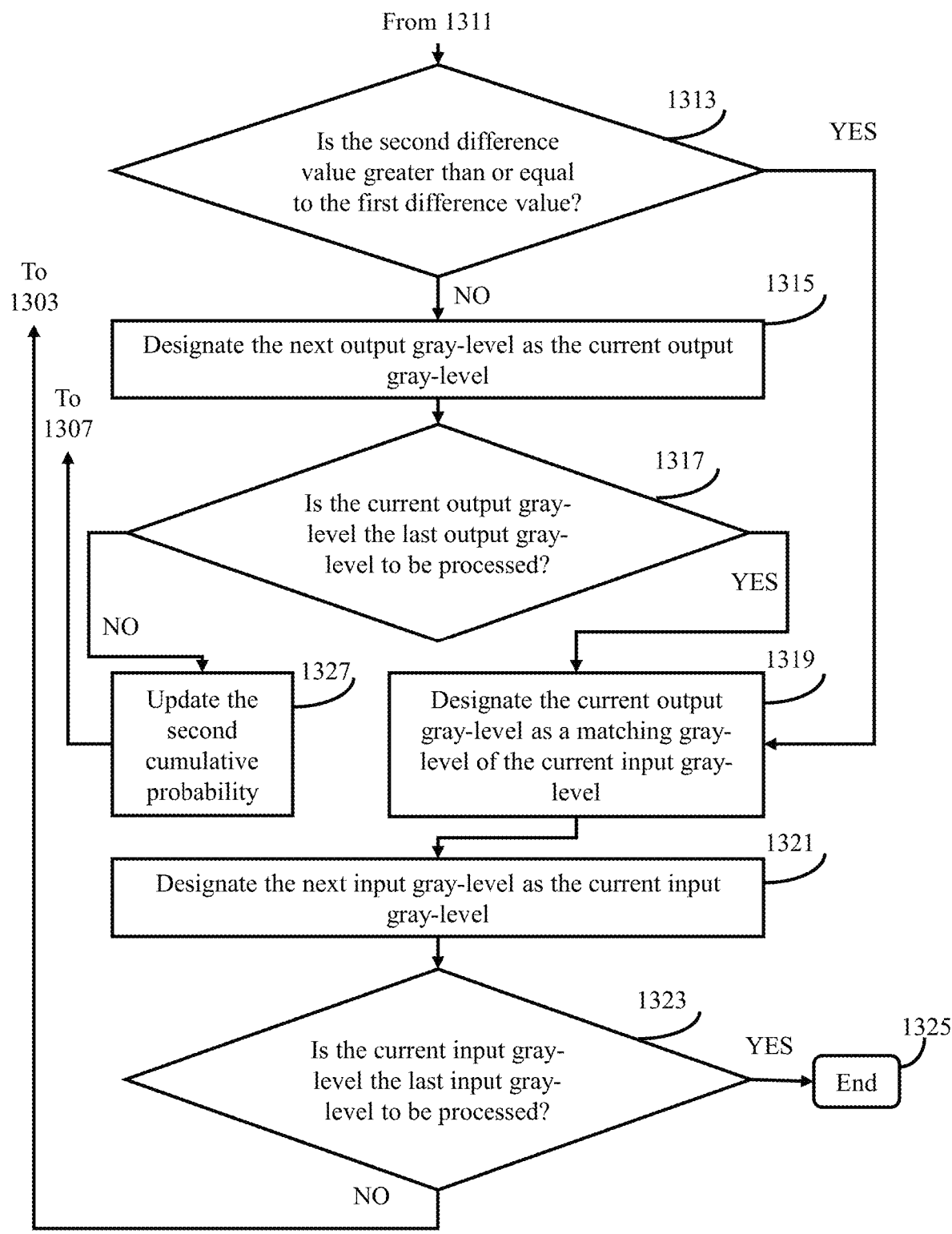

Referring to FIGS. 13(A)-13(B), an example 1300 of a process for mapping elements of an input image to elements of an output image in accordance with some embodiments of the present disclosure is shown. Process 1300 may be performed by processing logic that comprises hardware (e.g., circuitry, dedicated logic, programmable logic, microcode, etc.), software (e.g., instructions run on a processing device to perform hardware simulation), or a combination thereof. In some implementations, process 1200 may be performed by a processing device 120 as described above in connection with FIGS. 1-3.

As illustrated, process 1300 may begin at step 1301 by identifying a current input gray-level. The first input gray-level may be any suitable gray-level of one or more pixels in an input image. For example, a gray-level corresponding to the first index of the gray-levels may be identified (e.g., m=1).

At 1303, the processing device may determine a first cumulative probability for the current input gray-level. For example, the processing device may determine a cumulative probability of the gray-levels in the histogram that are not greater than the first gray-level. In some embodiments, the first cumulative probability may be determined based on equations (5)-(6).

At 1305, the processing device may determine a second cumulative probability for a current output gray-level. The current output gray-level may be any suitable gray-level of one or more pixels in an output image (e.g., an enhanced image). For example, the current output gray-level may be a gray-level corresponding to the first index of the gray-levels (e.g., m'=1). In some embodiments, the first cumulative probability may be determined based on equations (12)-(13).

At 1307, the processing device may determine a third cumulative probability for a next output gray-level. The next output gray-level may be any gray-level of one or more pixels in the output image. The next output gray-level and the current output gray-level may be different. In some embodiments in which the current output gray-level corresponds to index m', the next output gray-level may correspond to m'+1.

At 1309, the processing device may determine a first difference value representative of a difference between the first cumulative probability and the second cumulative probability. The first difference value may be determined based on an absolute difference, a squared difference, and/or any other value representative of a difference between the first cumulative probability and the second cumulative probability.

At 1311, the processing device may determine a second difference value representative of a difference between the first cumulative probability and the third cumulative probability. The second difference value may be determined based on an absolute difference, a squared difference, and/or any other value representative of a difference between the first cumulative probability and the third cumulative probability.

At 1313, the processing device may compare the first difference value and the second difference value and may determine whether the second difference value is greater than or equal to the first difference value. Additionally or alternatively, the processing device may determine whether the first difference value is greater than the second difference value based on the comparison.

In some embodiments, in response to determining that the second difference is not greater than or equal to the first difference value (e.g., "NO" at 1313), the processing device may proceed to block 1315 and may designate the next output gray-level as the current output gray-level.

In some embodiments, the processing device may proceed to block 1315 in response to determining that the first difference value is greater than the second difference value.

At 1317, process 1300 may determine whether the current output gray-level is the last output gray-level to be processed. For example, the processing device may compare the index of the current input gray-level (e.g., "m'") with the last input gray-level (e.g., L). The processing device may then determine that the current input gray-level is the last input gray-level to be processed in response to determining that the current input gray-level is greater than the last input gray level (e.g., by determining whether the value of m' satisfies m'>L). Alternatively, the processing device may determine that the current input gray-level is not the last input gray-level to be processed in response to determining that the current input gray-level is not greater than the last input gray level.

In some embodiments, in response to determining that the current output gray-level is the last output gray-level to be processed at block 1317, the processing device may proceed to block 1319 and may designate the current output gray-level as a target gray-level that matches the current input gray-level (e.g., a matching gray-level). The processing device can also record all the mapping relations between each and every pair of input gray-level and target gray-level. Alternatively or additionally, the processing device may proceed to block 1319 in response to determining that the second difference is less than the first difference value (e.g., "YES" at block 1313).

At 1321, the processing device may designate the next input gray-level as the current input gray-level.

At 1323, the processing device may determine whether the current input gray-level is the last input gray-level to be processed. For example, the processing device may compare the index of the current input gray-level (e.g., "m") with the last input gray-level (e.g., "K"). The processing device may then determine that the current input gray-level is the last input gray-level to be processed in response to determining that the current input gray-level is greater than the last input gray level (e.g., by determining whether the value of m satisfies m>K). Alternatively, the processing device may determine that the current input gray-level is not the last input gray-level to be processed in response to determining that the current input gray-level is not greater than the last input gray level.

In some embodiments, in response to determining that the current input gray-level is the last input gray-level to be processed, process 1300 may conclude at 1325. Alternatively, in response to determining that one or more input gray-level is to be processed (e.g., "NO") at block 1323, the processing device may loop back to 1303 and may determine first cumulative probability for the current input gray-level.

In some embodiments, in response to determining that the current output gray-level is not the last output gray-level to be processed (e.g., "NO" at 1317), the processing device may proceed to 1325 and may update the second cumulative probability. For example, the third cumulative probability determined previously at 1307 may be designated as the second cumulative probability.

The processing device may then loop back to block 1307 and may determine a third cumulative probability for a next output gray-level.

Figure 14:
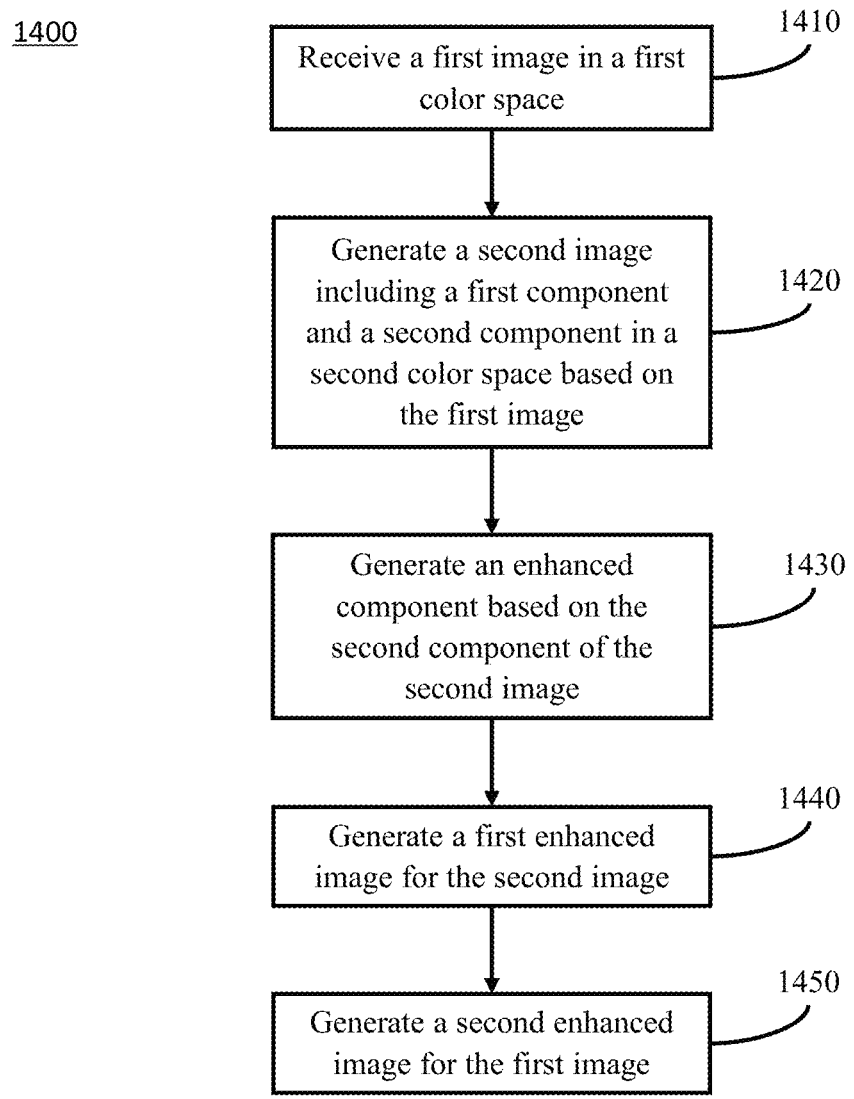
FIG. 14 is a diagram illustrating an example of a process for image processing in accordance with another embodiment of the disclosed subject matter.

Referring to FIG. 14, an example 1400 of a process for image processing in accordance with some embodiments of the disclosed subject matter is shown. Process 1400 may be performed by processing logic that comprises hardware (e.g., circuitry, dedicated logic, programmable logic, microcode, etc.), software (e.g., instructions run on a processing device to perform hardware simulation), or a combination thereof. In some implementations, process 1400 may be performed by a processing device 120 as described above in connection with FIGS. 1-3.

As illustrated, process 1400 can start by receiving a first image in a first color space at 1410. The first color space may be an RGB color space, a CMYK color space, etc. The first image may be provided by an image acquisition device (e.g., an image acquisition device 150 of FIG. 1), a storage device (e.g., the image storage module 110 of FIG. 2), and/or any other device that is capable of providing an image.

At 1420, process 1400 can generate a second image in a second color space based on the first image. For example, values representative of information about the first image in the first color space (e.g., color information, luminance information, etc.) may be converted into values in the second color space. In some embodiments, the second image may include one or more components representing luminance, color, and/or any other information about the second image in the second color space. For example, the second image can include a first component containing color information (e.g., a color component). As another example, the second image can include a second component containing luminance information (e.g., a luminance component). In some embodiments, the first component and second component can be stored in one or more storage devices for further processing.

In some embodiments, the second color space may be a color space in which luminance information and color information of an image may be separated in different channels and/or dimensions, such as an interchange color space. The second color space may represent an image using one or more luminance components and color components. Examples of the second color space include the Lab space, the YUV space, the HSV (hue, saturation and value) space, etc. In some embodiments, even for the same interchange color space, different sets of transformation coefficients may be chosen for different color spaces.

The second image can be generated using any technique or combination of techniques for color space conversion. For example, the first image (e.g., an RGB image, a CMYK image, etc.) can be transformed to a specific absolute color space, such as the sRGB, the Adobe RGB, etc. More particularly, for example, values of the first image represented in the first color space may be transformed to values represented in the specific absolute color space. This transformation may be device-dependent in some embodiments. The values generated by the transformation (e.g., sRGB, Adobe RGB values, etc.) may also be device-independent in some embodiments. The values represented in the specific absolute color space may be transformed to the CIE 1931 color space and may then be transformed into the Lab space. The CIE 1931 color spaces are quantitative link between a physical pure colors (e.g., wavelengths) in the visible light spectrum and physiological perceived colors (by human eyes). The mathematical relationships behind the CIE 1931 color space allow one to translate different physical responses to visible radiation in color inks, illuminated displays, and recording devices such as modern digital cameras into a universal human color vision response.

In some embodiments, the second color space may be same as the first color space. The steps of color conversion may be omitted from process 1400 in such embodiments.

At 1430, process 1400 can generate an enhanced component based on the second component of the second image. For example, one or more enhancement techniques described in connection with FIGS. 1-13 may be used to generate the enhanced component. In some embodiments, the enhanced component may be generated based on the luminance component of the second image (e.g., the "enhanced luminance component").

In some embodiments, the enhanced component can be stored in a memory in which the first component is stored. Alternatively, the enhanced second component and the first component may be stored in different storage devices in some embodiments.

At 1440, process 1400 can generate a first enhanced image for the second image. For example, the enhanced image may be generated by integrating the first component and the enhanced second component. In some embodiments, the first component may be processed using one or more image processing techniques, such as, saturation adjustment, hue adjustment, and so on.

At 1450, process 1400 can generate a second enhanced image for the first image. For example, process 1400 can transform the first enhanced image into an image in the first color space. The transformation may be performed using any technique or combination of techniques for color space conversion. The enhanced image may be outputted or ready for further processing.

The enhancement method provided in the present disclosure may be carried out on any format type including graphics interchange format (with a .GIF extension name), bitmapped graphics format (with a .BMP or .DIB extension name), joint picture expert group (with a JPEG or JPG extension name) format, portable network graphics (with a .PNG extension name) format, or tagged image file format (with a .TIFF or .TIF extension name), and not subject to any compression scheme or encoding scheme of a given color image.

Figure 15:
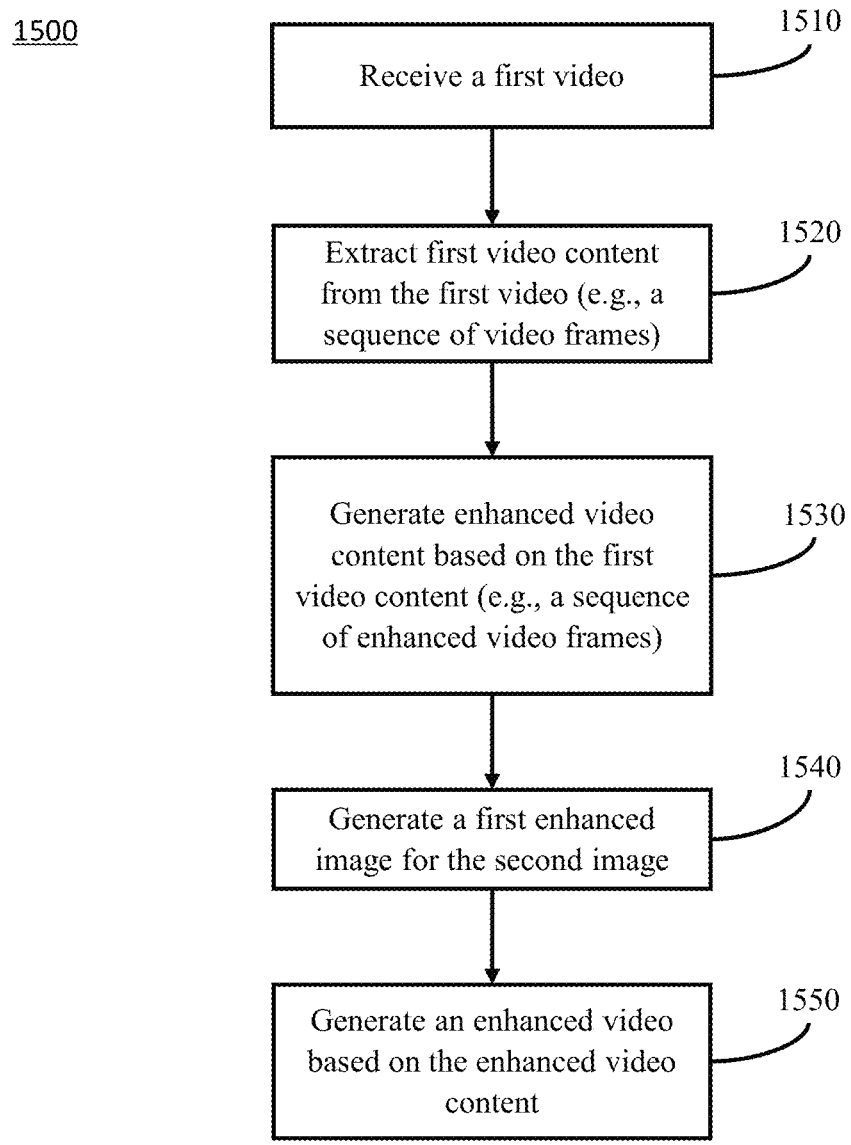
FIG. 15 is a diagram illustrating an example of a process for video processing according to some embodiments of the present disclosure.

Referring to FIG. 15, an example 1500 of a process for video processing in accordance with some embodiments of the disclosed subject matter is shown. Process 1500 may be performed by processing logic that comprises hardware (e.g., circuitry, dedicated logic, programmable logic, microcode, etc.), software (e.g., instructions run on a processing device to perform hardware simulation), or a combination thereof. In some implementations, process 1500 may be performed by a processing device 120 as described above in connection with FIGS. 1-3.

As illustrated, process 1500 can start by receiving a first video at 1510. The first video may be provided by an image acquisition device (e.g., an image acquisition device 150 of FIG. 1), a storage device (e.g., the image storage module 110 of FIG. 2), and/or any other device that is capable of providing a video. The first video may include video content (also referred to herein as the "first video content"), audio content (also referred to herein as the "first audio content"), captioning content, and/or any other content. The first video content may correspond to multiple video frames (e.g., a sequence of video frames).

At 1520, process 1500 can extract first video content from the first video. For example, process 1500 can extract the video frames from the video content of the first video. The video content can be extracted from the first video using any media demultiplexing technique that can demultiplex audio content, video content, captioning content, and/or any other media content. Alternatively, the first video may contain video content only. The demultiplexing step may be omitted. The video frames can be extracted from the video content using any suitable video decoding and/or image processing technique.

In some embodiments, the extracted video content can include multiple video frames, such as a first video frame, a second video frame, etc. Any suitable number of video frames can be extracted from the first video. For example, all of the video frames in the video content can be extracted. The number of video frames may be determined by the duration of the video content and the frame rate of the video content. As another example, a certain number of video frames can be extracted. More particularly, for example, one or more video scenes in the video content may be detected using any suitable scene detection technique and/or any other image processing technique. As still another example, video frames corresponding to certain frame numbers may be extracted.

At 1530, process 1500 can generate enhanced video content based on the first video content. For example, the enhanced video content can be generated by generating multiple enhanced video frames for the extracted video frames, organizing the enhanced video frames into a new frame sequence or an enhanced frame sequence, and/or performing any other suitable function. The enhanced video frames can be generated by generating an enhanced image for each of the extracted video frames. Each of the enhanced video frames may be generated by performing one or more operations described above in connection with FIGS. 12-14. Multiple enhanced video frames may be generated using the same or different image enhancement techniques. As an example, a first enhanced video frame and a second enhanced video frame may be generated for the first video frame and the second video frame, respectively. In some embodiments the same mapping rule for two or more adjacent video frames in the timeline (and/or video frames with similar video content) to generate the enhanced video frames.

In some embodiments, the first audio content may be stored in a storage device. Alternatively or additionally, the first audio content may be processed using any suitable audio processing technique to produced enhanced audio content.

At 1540, process 1500 can generate an enhanced video based on the enhanced video content. For example, the enhanced video content can be combined with the first audio content, the captioning content, etc. using any multiplexing technique and/or any other video processing technique. In some embodiments, the enhanced video content may be synchronized with the first audio content and/or the enhanced audio content for playback by a display device. The enhanced video content may also be processed using any video compression technique and/or any other video processing technique.

The enhancement method described in connection with FIG. 15 may be carried out on any video type, and not subject to any file format or encoding scheme of a given video.

It should be noted that the above steps of the flow diagrams of FIGS. 12-15 can be executed or performed in any order or sequence not limited to the order and sequence shown and described in the figures. Also, some of the above steps of the flow diagrams of FIGS. 12-15 can be executed or performed substantially simultaneously where appropriate or in parallel to reduce latency and processing times. Furthermore, it should be noted that FIGS. 12-15 are provided as examples only. At least some of the steps shown in these figures can be performed in a different order than represented, performed concurrently, or altogether omitted.

The method for image enhancement provided here is versatile and effective, both in terms of quality of processed images and hardware overhead. When applied on grayscale images, it improves the gray level distribution and facilitates the extraction of the relevant information. On the other hand, when dealing with color image, the method presented in this disclosure keeps the hue and saturation consistent, which are essential in color image processing. The utilization of a two-dimensional distributing function ensures the distribution of pixels in distinct gray level adjustable and depending on the shape of the function and the choice of parameters which specify the function. The method is proven to be able to reach a balance between enhancement effect and preservation of image details.

The image enhancement method described hereinbefore may be utilized in many areas, such as image processing, cinematography, video editing, security surveillance, environmental monitoring, aerial photography, medical imaging, quality inspection in construction engineering, and various other fields. The image on which the procedures proposed by the disclosure may be in any type, such as photographs, or computer graphics (CG), grayscale image. Furthermore, images may vary in their origins or generations, for example, an image may be a visible-light photograph, an infrared photograph, an image formed by an image-forming device, a microwave image, a radar image, a sonar image, a transmission electron microscopy (TEM) image, a scanning electron microscopy (SEM) image, a scanning tunneling microscopy (STM) image, or an atomic force microscopy (AFM) image in chemical or material sciences. While the types, origins or generations of images may be distinct, the present disclosure provides a robust and generic way to enhance their visual quality.

The steps of the method described herein may be implemented in any suitable order or simultaneously in appropriate circumstances. In addition, individual steps may be deleted from any method without departing from the spirit and scope of the subject matter described herein. Various aspects of any example described above may be combined with various aspects of any example in other examples described, so as to constitute a further example without losing the effect sought.

It should be noted that the 2D histogram specification scheme proposed herein may be carried out in a whole image, as well as in a local part or several local parts in the 2D plane of an image. The local part may be generated by cropping or segmentation. While global histogram specification enhances the contrast of the whole image, the local approach may enhance many image details by taking different transformation of the same gray level at different places in the original image. Thus, various details in distinct parts of an image may be treated discriminatively. The global specification, along with its local counterpart, should be within the scope of the present disclosure.

Also, the 2D histogram specification may be carried out on the whole histogram or at least one part of the histogram. For example, the left side (darker parts in an image) or the right side (brighter parts in an image) of the histogram of an image may be enhanced by histogram specification method provided in this disclosure.

Aspects of the present disclosure may also be realized by enormous hardware or computing devices. As described in the present disclosure, an image enhancement device may be designed to perform the disclosed methods and manipulations, alternatively, a suitably programmed digital signal processor for image processing or general purpose computer processor equipped with a processor or several buffer storages may also be used to implement the method given a specific software to execute image enhancement. Such a software implementation of the disclosure may be appropriate for image enhancement software in a personal computer, or embedded in the image processing module in a digital camera or a mobile phone. It may also be suitable for embedded implementation in image acquisition devices such as compact digital cameras, digital single reflex cameras (DSLRs), or camera-phones such as feature phones or smart phones with imaging components, which typically include a general purpose microprocessor or a digital signal processor.

The present disclosure may be embodied in a general-purpose personal computer, including a processor for executing an image-processing software application according to the steps or workflow described in the present disclosure, a memory or any other computer-readable medium for storing program code and for storing one or more digital images, one or more input devices such as a keyboard and a mouse for enabling a user to interact with the software application via a cursor, a display device, and a bus for intercommunication between these components. Typically, the processor (or a set of processors) is coupled to the memory and the input device(s), and the display device and the bus. The computer may also include an interface for receiving digital images from a digital scanner or a digital camera, and a wired or wireless network connection for receiving and transmitting digital images over the Internet. The image processing device may further comprise a display unit such as a liquid crystal display (LCD) or light emitting diode (LED) display to display the original and processed image for the sake of comparison.

The present disclosure may be implemented in mobile computing devices, in Internet appliances such as electronic picture frames, within transportation vehicles such as airplanes, ships or automobiles, and within image acquisition equipment such as digital cameras, mobile telephones, surveillance cameras and other mobile devices with embedded digital imaging modules, and medical scanners. The present disclosure may be implemented in a client-server model on a pair of computers interconnected via a computer network. The present disclosure may also be implemented in software or in general-purpose or special-purpose hardware, or in a software-hardware combination.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "determining," "receiving," "generating," "computing," "providing," "executing," "constructing," "storing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first," "second," "third," "fourth," etc. as used herein are meant as labels to distinguish among different elements and may not necessarily have an ordinal meaning according to their numerical designation.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Although the illustrative embodiments of the present disclosure have been described herein with reference to the accompanying drawings, it is to be understood that the disclosure is not limited to those precise embodiments, and various changes and modifications may be effected therein by one skilled in that art without departing from the scope of the present disclosure as defined in the following claims.

What is claimed is:

1. A method for image processing, comprising:
   obtaining, by a processor, a first image including a plurality of pixels;
   for each of at least one of the plurality of pixels,
      identifying, by the processor, at least one neighboring pixel of the pixel in the first image; and
      determining, by the processor, contextual information about the pixel based on at least one gray-level each of which corresponds to one of the at least one neighboring pixel; and
   generating, by the processor, a first histogram based on the contextual information of the plurality of pixels and a first parameter set for the first image;
   constructing, by the processor, a model based on an adjustment parameter set and the first parameter set;
   generating a second histogram based on the model; and
   generating a second image based on the first image and the second histogram.

2. The method of claim 1, wherein the first histogram is a two-dimensional histogram.

3. The method of claim 1, wherein the model is constructed based on at least one of a Gaussian function, a Lorentzian function, an exponential function, or a polynomial function.

4. The method of claim 1, wherein the first parameter set comprises a parameter indicative of luminance information of the first image.

5. The method of claim 1, wherein the first parameter set comprises a parameter indicative of contrast information of the first image.

6. The method of claim 1, wherein the adjustment parameter set is received via an input device.

7. The method of claim 1, wherein the adjustment parameter set is determined by the processor.

8. The method of claim 7, wherein the adjustment parameter set includes one or more adjustment parameters indicative of intensity information, luminance information or contrast information associated with the second image to be generated.

9. The method of claim 1, further comprising:
generating a third image comprising a first component and a second component based on the first image, wherein the first image is in a first color space, and wherein the third image is in a second color space;
generating an enhanced component based on the second component of the third image, wherein the second component comprises luminance information about the third image; and
generating the second image based on the enhanced component.

10. The method of claim 1, wherein determining the contextual information about the pixel is based further on at least one distance between the pixel and at least one of the at least one neighboring pixel.

11. The method of claim 10, wherein the determining the contextual information about the pixel based further on at least one distance between the pixel and at least one of the at least one neighboring pixel includes:
for each of the at least one neighboring pixel, determining a weighting factor corresponding to the neighboring pixel based on a distance between the pixel and the neighboring pixel; and
determining the contextual information about the pixel based on the at least one weighting factor.

12. The method of claim 1, wherein the contextual information about the pixel includes at least one of a gray-level of a neighboring pixel of the pixel, an intensity value of the neighboring pixel, positional information of the neighboring pixel, or a distance between the neighboring pixel and the pixel.

13. A system for image processing, comprising:
a memory; and
a processor communicatively coupled to the memory, the processor to:
obtain a first image including a plurality of pixels;
for each of at least one of the plurality of pixels, identify at least one neighboring pixel of the pixel in the first image; and
determine contextual information about the pixel based on at least one gray-level each of which corresponds to one of the at least one neighboring pixel; and
generate a first histogram based on the contextual information of the plurality of pixels and a first parameter set for the first image;
construct a model based on an adjustment parameter set and the first parameter set;
generate a second histogram based on the model; and
generate a second image based on the first image and the second histogram.

14. The system of claim 13, wherein the first histogram is a two-dimensional histogram.

15. The system of claim 13, wherein the processor is further to construct the model based on at least one of a Gaussian function, a Lorentzian function, an exponential function, or a polynomial function.

16. The system of claim 13, wherein the first parameter set comprises a parameter indicative of luminance information of the first image.

17. The system of claim 13, wherein the first parameter set comprises a parameter indicative of contrast information of the first image.

18. The system of claim 13, wherein the processor is further to:
generate a third image including a first component and a second component based on the first image, wherein the first image is in a first color space, and wherein the third image is in a second color space;
generate an enhanced component based on the second component of the third image, wherein the second component comprises luminance information about the third image; and
generate the second image based on the enhanced component.

19. The system of claim 13, wherein the adjustment parameter set includes one or more adjustment parameters indicative of intensity information, luminance information or contrast information associated with the second image to be generated.

20. A non-transitory machine-readable storage medium including instructions that, when accessed by a processing device, causing the processing device to:
obtain a first image including a plurality of pixels;
for each of at least one of the plurality of pixels,
identify at least one neighboring pixel of the pixel in the first image; and
determine contextual information about the pixel based on at least one gray-level each of which corresponds to one of the at least one neighboring pixel; and
generate a first histogram based on the contextual information of the plurality of pixels and a first parameter set for the first image;
construct a model based on an adjustment parameter set and the first parameter set;
generate a second histogram based on the model; and
generate a second image based on the first image and the second histogram.

* * * * *